United States Patent
Sun et al.

(10) Patent No.: US 12,411,651 B2
(45) Date of Patent: Sep. 9, 2025

(54) VIDEO RECORDING METHOD AND ELECTRONIC DEVICE

(71) Applicant: Huawei Technologies Co., Ltd., Shenzhen (CN)

(72) Inventors: Yue Sun, Shanghai (CN); Qi Xiong, Shanghai (CN); Jun Li, Shanghai (CN); Yuqian Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 18/263,376

(22) PCT Filed: Jan. 10, 2022

(86) PCT No.: PCT/CN2022/071129
§ 371 (c)(1),
(2) Date: Jul. 28, 2023

(87) PCT Pub. No.: WO2022/161146
PCT Pub. Date: Aug. 4, 2022

(65) Prior Publication Data
US 2024/0111478 A1   Apr. 4, 2024

(30) Foreign Application Priority Data
Jan. 29, 2021 (CN) .......................... 202110130811.3

(51) Int. Cl.
*H04N 23/63*   (2023.01)
*G06F 3/16*    (2006.01)
(Continued)

(52) U.S. Cl.
CPC ............ *G06F 3/165* (2013.01); *G06V 40/171* (2022.01); *H04N 5/772* (2013.01); *H04N 23/632* (2023.01)

(58) Field of Classification Search
USPC ....................................................... 386/224
See application file for complete search history.

(56) References Cited

U.S. PATENT DOCUMENTS

| 10,235,011 B2 * | 3/2019 | Chen | ...................... G06F 9/453 |
| 2017/0064174 A1 * | 3/2017 | Xiao | ...................... G06T 11/60 |

(Continued)

FOREIGN PATENT DOCUMENTS

| CN | 103888703 A | 6/2014 |
| CN | 105245811 A | 1/2016 |

(Continued)

OTHER PUBLICATIONS

Joseph Redmon et al., "You Only Look Once: Unified, Real-Time Object Detection", arxiv:1506.02640v5, May 9, 2016, 10 pages.
(Continued)

*Primary Examiner* — Nigar Chowdhury
(74) *Attorney, Agent, or Firm* — Conley Rose, P.C.

(57) ABSTRACT

A video recording method includes a first electronic device that records a first shot image in response to a first operation of a user on a preview interface of an application, and records audio corresponding to the first shot image at a first volume. The first electronic device captures a second shot image and audio corresponding to the second shot image in response to a zoom-in operation of the user on the first shot image. The first shot image and the second shot image are consecutive. The first electronic device records the second shot image, and records the audio corresponding to the second shot image at a second volume.

20 Claims, 17 Drawing Sheets

(51) Int. Cl.
*G06V 40/16* (2022.01)
*H04N 5/77* (2006.01)

(56) References Cited

U.S. PATENT DOCUMENTS

| | | | | |
|---|---|---|---|---|
| 2017/0173262 A1* | 6/2017 | Veltz | ............... | G16H 20/17 |
| 2017/0289681 A1* | 10/2017 | Yuan | ............... | H04N 23/61 |
| 2017/0353788 A1* | 12/2017 | Tatematsu | ............ | G06F 3/04883 |
| 2018/0077362 A1* | 3/2018 | Prasad | ............. | H04N 21/23418 |
| 2018/0210697 A1* | 7/2018 | Rakshit | ................ | G11B 27/031 |
| 2018/0330756 A1* | 11/2018 | MacDonald | .......... | G06F 16/951 |
| 2019/0045303 A1* | 2/2019 | Zhang | ...................... | H04R 3/12 |
| 2019/0147721 A1* | 5/2019 | Avitan | .................. | G06F 1/3209 |
| | | | | 340/573.1 |
| 2019/0215540 A1* | 7/2019 | Nicol | .................. | H04N 21/233 |
| 2019/0281223 A1* | 9/2019 | Kelly | .................. | H04N 23/667 |
| 2020/0064995 A1* | 2/2020 | Gorsica | ............. | H04M 1/72448 |
| 2020/0260049 A1* | 8/2020 | Erna | ...................... | H04N 23/57 |
| 2020/0374456 A1* | 11/2020 | Kelly | .................... | H04N 23/66 |
| 2021/0132783 A1* | 5/2021 | Chung | ................ | G06F 3/04886 |

FOREIGN PATENT DOCUMENTS

| | | |
|---|---|---|
| CN | 106157986 A | 11/2016 |
| CN | 106162206 A | 11/2016 |
| CN | 107105183 A | 8/2017 |
| CN | 107613383 A | 1/2018 |
| CN | 108391057 A | 8/2018 |
| CN | 108933911 A | 12/2018 |
| CN | 108933916 A | 12/2018 |
| CN | 110740259 A | 1/2020 |
| EP | 3073747 A1 | 9/2016 |
| JP | 2004040491 A | 2/2004 |
| JP | 2011215221 A | 10/2011 |
| JP | 2011215222 A | 10/2011 |

OTHER PUBLICATIONS

Amirsina Torfi et al., "3D Convolutional Neural Networks for Cross Audio-Visual Matching Recognition", arxiv:1706.05739v5, Aug. 13, 2017, 11 pages.

* cited by examiner

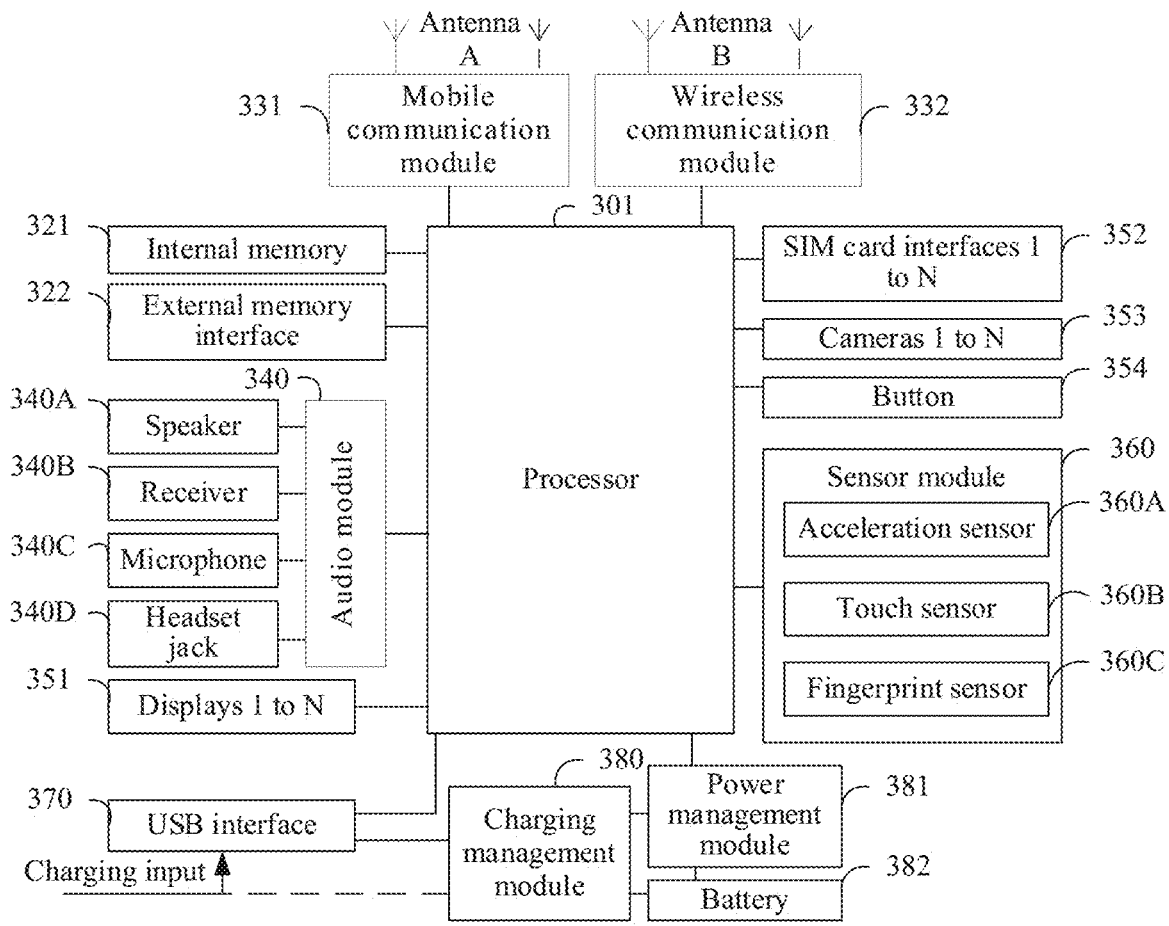

VIDEO RECORDING METHOD AND ELECTRONIC DEVICE

CROSS-REFERENCE TO RELATED APPLICATIONS

This is a U.S. National Stage of International Patent Application No. PCT/CN2022/071129 filed on Jan. 10, 2022, which claims priority to Chinese Patent Application No. 202110130811.3 filed on Jan. 29, 2021. Both of the aforementioned applications are hereby incorporated by reference in their entireties.

TECHNICAL FIELD

This application relates to the field of terminals, and in particular, to a video recording method and an electronic device.

BACKGROUND

Currently, when a terminal device records a video, volume of sound information recorded by the terminal device is usually positively correlated with volume of sound information captured by a microphone of the terminal device. A user cannot flexibly adjust a recorded sound during recording, and flexibility of volume adjustment is poor when the terminal device records video information, resulting in a poor audio-visual effect.

SUMMARY

Embodiments of this application provide a video recording method and an electronic device, to resolve a problem of poor flexibility of volume of video information recorded by an electronic device, thereby improving an audio-visual effect of played video information.

To achieve the foregoing objective, the following technical solutions are used in this application.

According to a first aspect, an embodiment of this application provides a video recording method, applied to a first electronic device. Specifically, the method provided in the first aspect includes: A first electronic device records a first shot image in response to a first operation of a user on a preview interface of an application, and records audio corresponding to the first shot image at first volume. The first electronic device captures a second shot image and audio corresponding to the second shot image in response to a zoom-in operation of the user on the first shot image. The first shot image and the second shot image are consecutive. The first electronic device records the second shot image, and records the audio corresponding to the second shot image at second volume. The second volume is greater than the first volume, or a sound amplification ratio corresponding to the second volume is greater than a sound amplification ratio of the first volume, and the sound amplification ratio is a ratio of volume output by the first electronic device to captured volume.

According to the video recording method provided in the first aspect of this application, the second shot image and the audio corresponding to the second shot image are obtained after the user performs a zoom-in operation on the first shot image. While recording the second shot image, the first electronic device records the audio corresponding to the second shot image at the second volume. In this way, when recorded video information is played, the user can visually feel that the second shot image is closer to the user, and in addition, the user can also aurally feel that the second shot image is closer to the user, thereby improving an audio-visual effect of the recorded video information.

In a possible design solution, the audio corresponding to the first shot image includes audio of a first photographed object. Before the first electronic device captures the second shot image and the audio corresponding to the second shot image in response to the zoom-in operation of the user on the first shot image, the method provided in the first aspect further includes: The first electronic device establishes an association relationship between an image and the audio of the first photographed object. The first electronic device marks the audio of the first photographed object as to-be-adjusted audio in response to a second operation of the user on the first shot image. That the first electronic device records the audio corresponding to the second shot image at second volume includes: The first electronic device records the audio corresponding to the first photographed object in the second shot image at the second volume. In this way, the first electronic device may record the audio corresponding to the selected first photographed object at the second volume, and flexibility is higher.

Further, the audio corresponding to the first shot image includes audio of a second photographed object, and the method provided in the first aspect further includes: The first electronic device establishes an association relationship between an image and the audio of the second photographed object. That the first electronic device records the audio corresponding to the second shot image at second volume further includes: The first electronic device records the audio corresponding to the second photographed object in the second shot image at the first volume or the sound amplification ratio corresponding to the first volume. In this way, the first electronic device may record the audio corresponding to the selected first photographed object only at the second volume, and flexibility is higher.

Alternatively, further, the audio corresponding to the first shot image further includes audio of a third photographed object. Before the first electronic device captures the second shot image and the audio corresponding to the second shot image in response to the zoom-in operation of the user on the first shot image, the method provided in the first aspect further includes: The first electronic device establishes an association relationship between an image and the audio of the third photographed object. The first electronic device marks the audio of the third photographed object as to-be-adjusted audio in response to a third operation of the user on the first shot image. That the first electronic device records the audio corresponding to the second shot image at second volume further includes: The first electronic device records the audio corresponding to the third photographed object in the second shot image at the second volume or the sound amplification ratio corresponding to the second volume. In this way, the first electronic device may further record the audio corresponding to the selected third photographed object at the second volume, and flexibility is further increased.

Alternatively, further, the audio corresponding to the first shot image includes audio of a second photographed object. The method provided in the first aspect further includes: The first electronic device establishes an association relationship between an image and the audio of the second photographed object. That the first electronic device record the audio corresponding to the second shot image at the second volume or the sound amplification ratio corresponding to the second volume further includes: blocking audio associated with the image of the second photographed object in the second shot image. Correspondingly, when playing the recorded audio corresponding to the second shot image, the first electronic device plays the audio of the first photographed object at third volume higher than the first volume, and does not play the audio of the second photographed object, thereby reducing interference to the audio of the first photographed object.

Further, that the first electronic device establishes an association relationship between an image and the audio of the first photographed object and establishes an association relationship between an image and the audio of the second photographed object includes: The first electronic device extracts a first facial feature of the first photographed object and a first sound feature vector of the audio. The first electronic device determines, based on a lip shape of the first facial feature of the first photographed object, a first articulation feature corresponding to the lip shape. The first electronic device extracts a second articulation feature of the first sound feature vector. The first electronic device establishes an association relationship between the first facial feature and the first sound feature vector if a similarity between the first articulation feature and the second articulation feature is greater than a similarity threshold.

Alternatively, further, the method provided in the first aspect further includes: communicatively connecting to a second electronic device and a third electronic device when the first electronic device responds to the first operation of the user on the preview interface. That the first electronic device establishes an association relationship between an image and the audio of the first photographed object and establishes an association relationship between an image and the audio of the second photographed object includes: The first electronic device extracts a first facial feature of the first photographed object and a first sound feature vector of the audio, and extracts a second facial feature of the second photographed object and a second sound feature vector of the audio. The first electronic device sends the first facial feature, the first sound feature vector, the second facial feature, and the second sound feature vector to the second electronic device and the third electronic device. The first electronic device receives an association relationship between the first facial feature and the first sound feature vector from the second electronic device, and receives an association relationship between the second facial feature and the second sound feature vector from the third electronic device.

In a possible design solution, that the first electronic device captures a second shot image and audio corresponding to the second shot image includes: The first electronic device detects a first propagation direction of the audio of the first photographed object and a second propagation direction of the audio of the second photographed object in the second shot image. The first electronic device performs directional enhancement capturing on the audio of the first photographed object in the second shot image in the first propagation direction, and performs directional suppression capturing on the audio of the second photographed object in the second shot image in the second propagation direction. When the recorded audio corresponding to the second shot image is played, because the audio of the first photographed object is captured by an array microphone of the first electronic device in a directional enhancement manner, the played audio of the first photographed object is also clearer. In addition, the audio of the second photographed object is captured by the array microphone of the first electronic device in a directional suppression manner, and interference to the audio of the second photographed object is small, thereby further improving an audio-visual effect for the user to appreciate the video information.

In a possible design solution, the first electronic device determines the second volume based on the first shot image, the second shot image, and the first volume.

Further, that the first electronic device determines the second volume based on the first shot image, the second shot image, and the first volume includes: The first electronic device determines the second volume based on the first volume and a zoom ratio. F1 is a first focal length corresponding to the first shot image, F2 is a second focal length corresponding to the second shot image, F2/F1 is the zoom ratio, V is the first volume, and V' is the second volume.

Alternatively, further, that the first electronic device determines the second volume based on the first shot image, the second shot image, and the first volume includes: The first electronic device determines the second volume based on the first volume and a dimension scale-up ratio. x1×y1 is a first display dimension of the first photographed object in the first shot image, x1'×y1' is a third display dimension of the first photographed object in the second shot image, and $$\frac{x1' \times y1'}{x1 \times y1}$$

is the dimension scale-up ratio.

Alternatively, further, that the first electronic device determines the second volume based on the first shot image, the second shot image, and the first volume includes: The first electronic device determines the second volume based on the first volume, a dimension scale-up ratio, and a zoom ratio. F1 is a first focal length corresponding to the first shot image, F2 is a second focal length corresponding to the second shot image, $$\frac{F2}{F1}$$

is the zoom ratio, x1×y1 is a first display dimension of the first photographed object in the first shot image, x1'×y1' is a third display dimension of the first photographed object in the second shot image, V is the first volume, V' is the second volume, and $$\frac{x1' \times y1'}{x1 \times y1}$$

is the dimension scale-up ratio.

In a possible design solution, the first electronic device is in a headset mode. After the first electronic device captures the second shot image and the audio corresponding to the second shot image, the method provided in the first aspect further includes: The first electronic device displays the second shot image on the preview interface of the application, and outputs, at recorded volume, the audio corresponding to the second shot image to a headset for playback. The first electronic device may play the recorded video information while recording the video information, so that when the user plays the video information while recording the video information, the second shot image in the video information can match the audio played at the recorded volume, and the user has a better audio-visual effect.

Alternatively, in a possible design solution, the first electronic device is not in a headset mode. After the first electronic device records the second shot image, and records the audio corresponding to the second shot image at the second volume, the method provided in the first aspect further includes the following steps.

In response to a stop operation of the user on the preview interface, the first electronic device generates a video file based on the recorded second shot image and the audio corresponding to the second shot image. In response to an open operation of the user on the video file, the first electronic device displays the second shot image on the preview interface of the application, and plays the audio corresponding to the second shot image at the recorded volume by using a speaker of the first electronic device. The second shot image in the video information can match the audio played at the recorded volume, and the user has a better audio-visual effect.

According to a second aspect, an embodiment of this application provides a video recording method, applied to a first electronic device. The method provided in the second aspect includes: A first electronic device records a first shot image in response to a first operation of a user on a preview interface of an application, and records audio corresponding to the first shot image at first volume. The first electronic device captures a second shot image and audio corresponding to the second shot image in response to a zoom-out operation of the user on the first shot image. The first shot image and the second shot image are consecutive. The first electronic device records the second shot image, and records the audio corresponding to the second shot image at second volume. The second volume is less than the first volume, or a sound amplification ratio corresponding to the second volume is less than a sound amplification ratio of the first volume, and the sound amplification ratio is a ratio of volume output by the first electronic device to captured volume.

In a possible design solution, the audio corresponding to the first shot image includes audio of a first photographed object, and before the first electronic device captures the second shot image and the audio corresponding to the second shot image in response to the zoom-out operation of the user on the first shot image, the method provided in the second aspect further includes: The first electronic device establishes an association relationship between an image and the audio of the first photographed object. The first electronic device marks the audio of the first photographed object as to-be-adjusted audio in response to a second operation of the user on the first shot image. That the first electronic device records the audio corresponding to the second shot image at second volume includes: The first electronic device records the audio corresponding to the first photographed object in the second shot image at the second volume or the sound amplification ratio corresponding to the second volume.

Further, the audio corresponding to the first shot image includes audio of a second photographed object. The method provided in the second aspect further includes: The first electronic device establishes an association relationship between an image and the audio of the second photographed object. That the first electronic device records the audio corresponding to the second shot image at second volume further includes: The first electronic device records the audio corresponding to the second photographed object in the second shot image at the first volume or the sound amplification ratio corresponding to the first volume.

Further, the method provided in the second aspect further includes: communicatively connecting to a second electronic device and a third electronic device when the first electronic device responds to the first operation of the user on the preview interface. That the first electronic device establishes an association relationship between an image and the audio of the first photographed object and establishes an association relationship between an image and the audio of the second photographed object includes: The first electronic device extracts a first facial feature of the first photographed object and a first sound feature vector of the audio, and extracts a second facial feature of the second photographed object and a second sound feature vector of the audio. The first electronic device sends the first facial feature, the first sound feature vector, the second facial feature, and the second sound feature vector to the second electronic device and the third electronic device. The first electronic device receives an association relationship between the first facial feature and the first sound feature vector from the second electronic device, and receives an association relationship between the second facial feature and the second sound feature vector from the third electronic device.

Further, that the first electronic device determines the second volume based on the first shot image, the second shot image, and the first volume includes: The first electronic device determines the second volume based on the first volume and a zoom ratio. Alternatively, the first electronic device determines the second volume based on the first volume and a dimension scale-up ratio. Alternatively, the first electronic device determines the second volume based on the first volume, a dimension scale-up ratio, and a zoom ratio. F1 is a first focal length corresponding to the first shot image, F2 is a second focal length corresponding to the second shot image, $$\frac{F2}{F1}$$

is a zoom-out ratio, x1×y1 is a first display dimension of the first photographed object in the first shot image, x1'×y1' is a third display dimension of the first photographed object in the second shot image, V is the first volume, V' is the second volume, and $$\frac{x1' \times y1'}{x1 \times y1}$$

is a dimension scale-down ratio.

According to a third aspect, this application further provides an electronic device, including: a memory, one or more processors, and one or more computer programs. The one or more computer programs are stored in the memory, and when the computer program is executed by the one or more processors, the electronic device is enabled to perform the video recording method performed by the first electronic device in the first aspect or the second aspect of this application.

According to a fourth aspect, this application further provides a computer-readable storage medium. The computer-readable storage medium includes a computer program or instructions. When the computer program or the instructions are run on a computer, the computer is enabled to perform the video recording method provided in the first aspect or the second aspect of this application.

According to a fifth aspect, this application further provides a computer program product. The computer program product includes a computer program or instructions. When the computer program or the instructions are run on a computer, the computer is enabled to perform the video recording method provided in the first aspect or the second aspect of this application.

It may be understood that the electronic device in the third aspect, the computer-readable storage medium in the fourth aspect, and the computer program product in the fifth aspect that are provided above are all configured to perform the corresponding methods provided above. Therefore, for beneficial effects that can be achieved by the electronic device, the computer storage medium, and the computer program product, refer to beneficial effects in the corresponding methods provided above. Details are not described herein again.

BRIEF DESCRIPTION OF DRAWINGS (a) in FIG. 1 is a schematic diagram of a concert scenario according to an embodiment of this application;

(b) in FIG. 1 is a schematic diagram 1 of a first shot image according to an embodiment of this application;

FIG. 2 is a schematic diagram of a structure of a mobile phone according to an embodiment of this application;

FIG. 3 is a flowchart of a video recording method according to an embodiment of this application;

Figure 4:
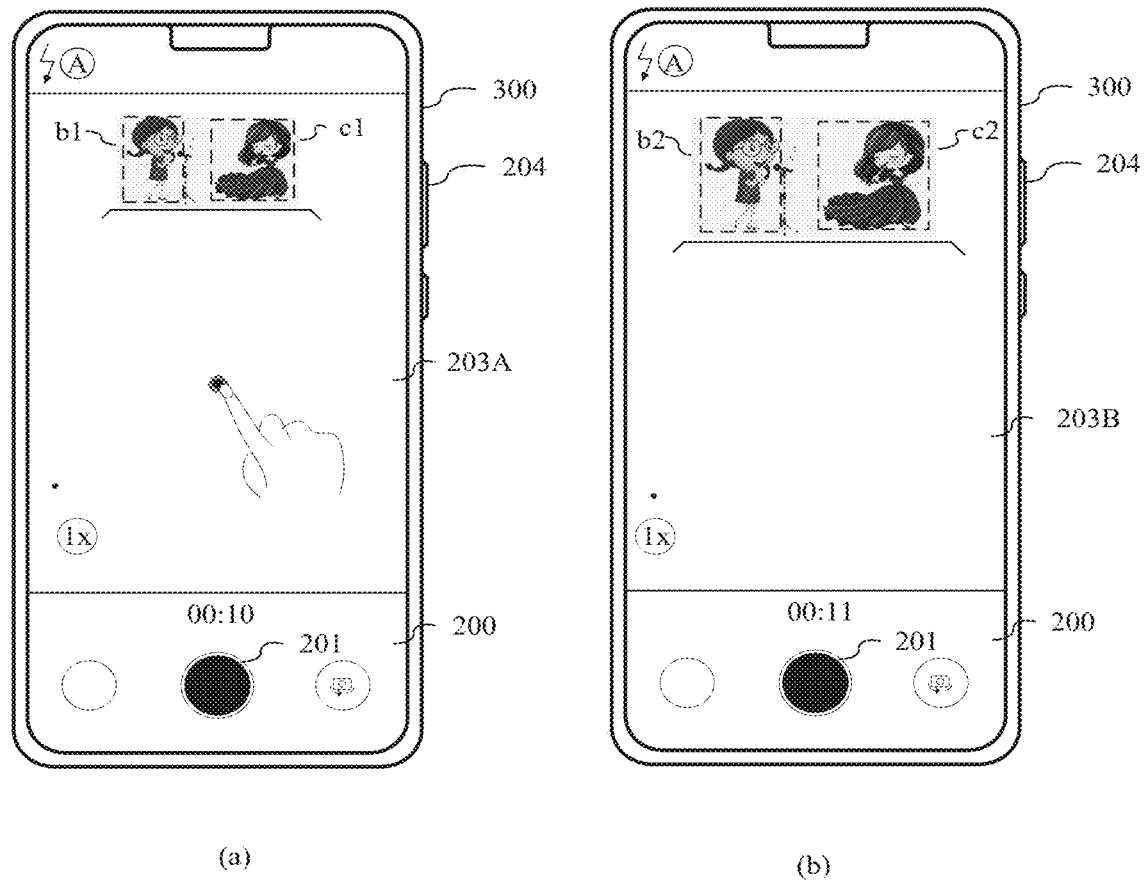
Figure 5:
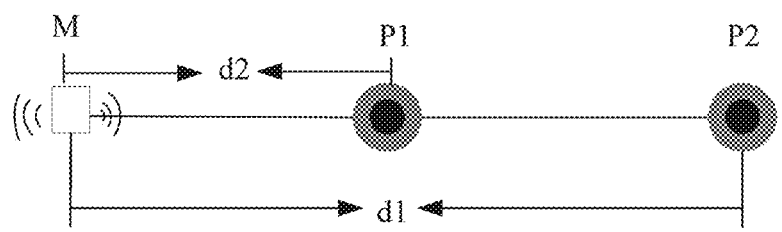
Figure 6:
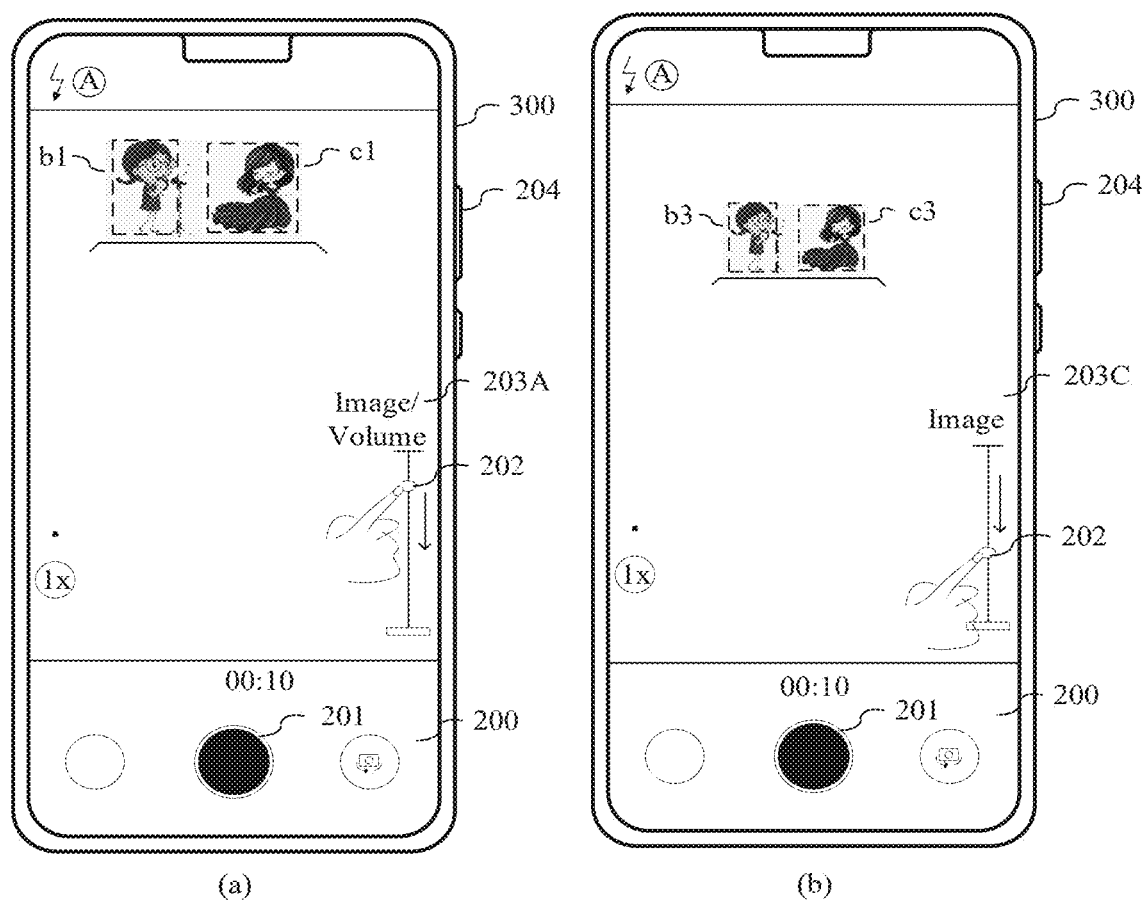
Figure 7:
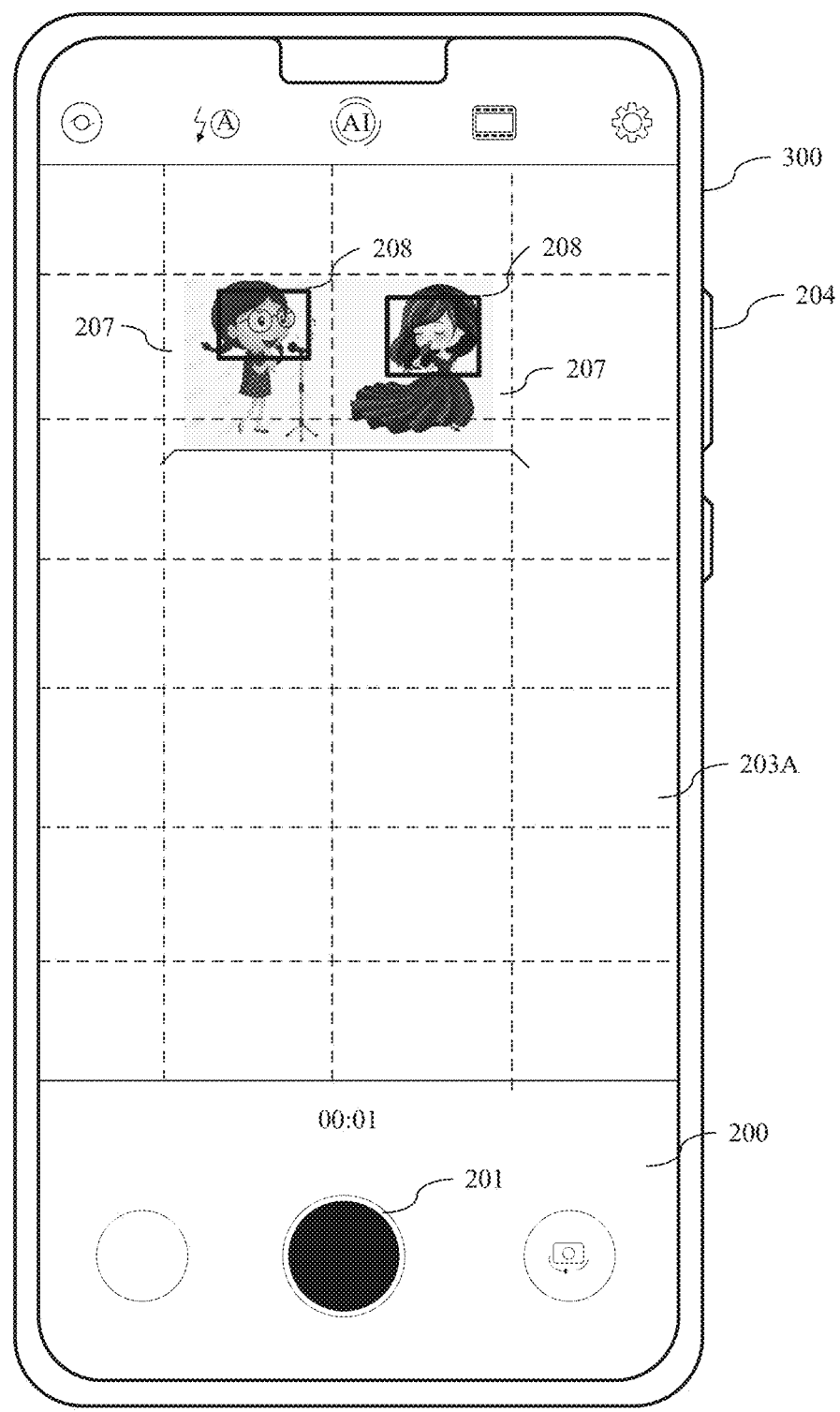
Figure 8:
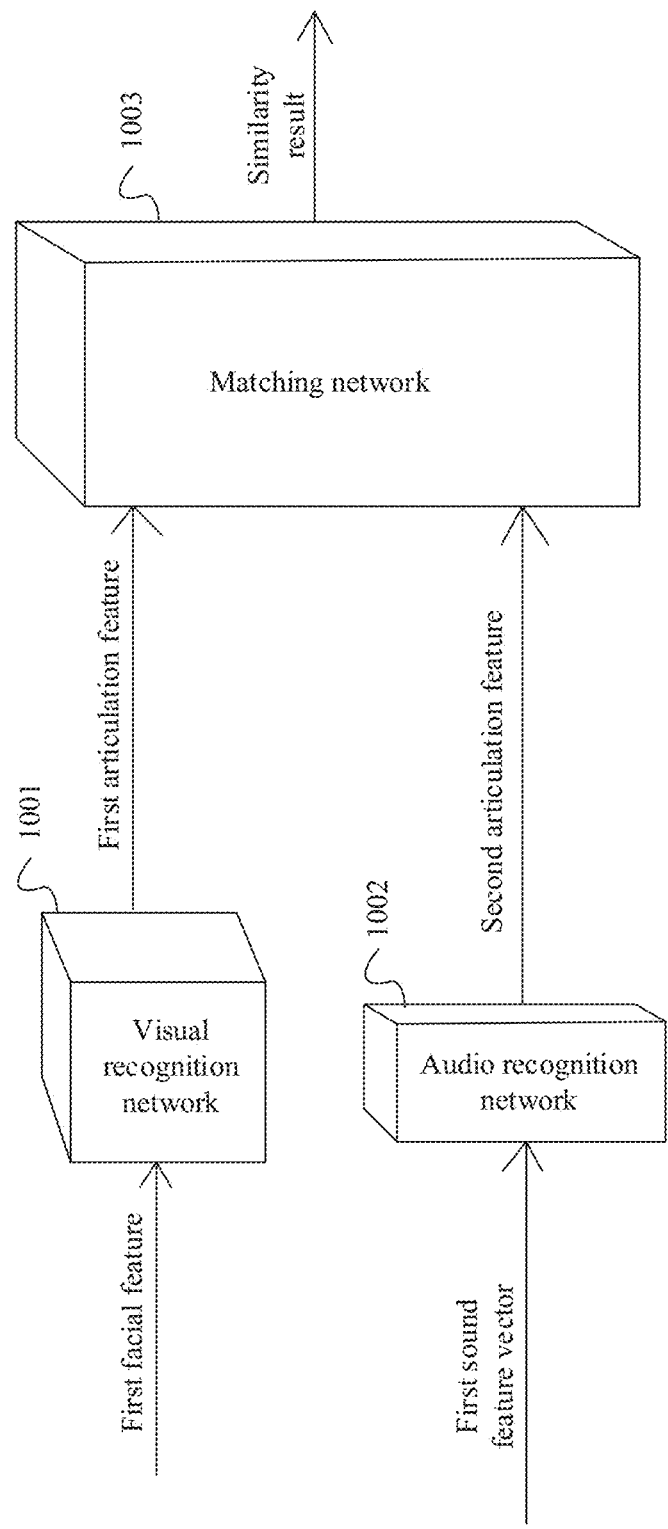
Figure 9:
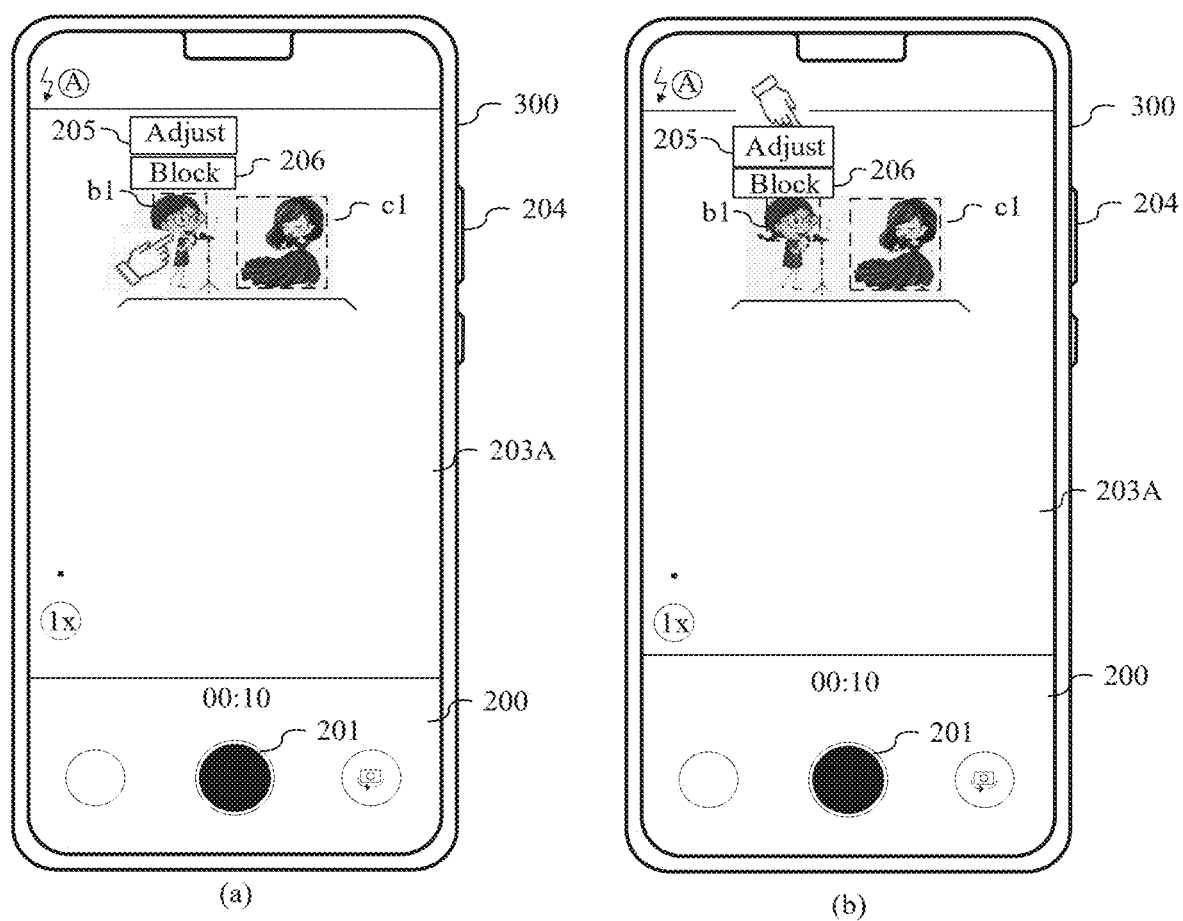
Figure 10:
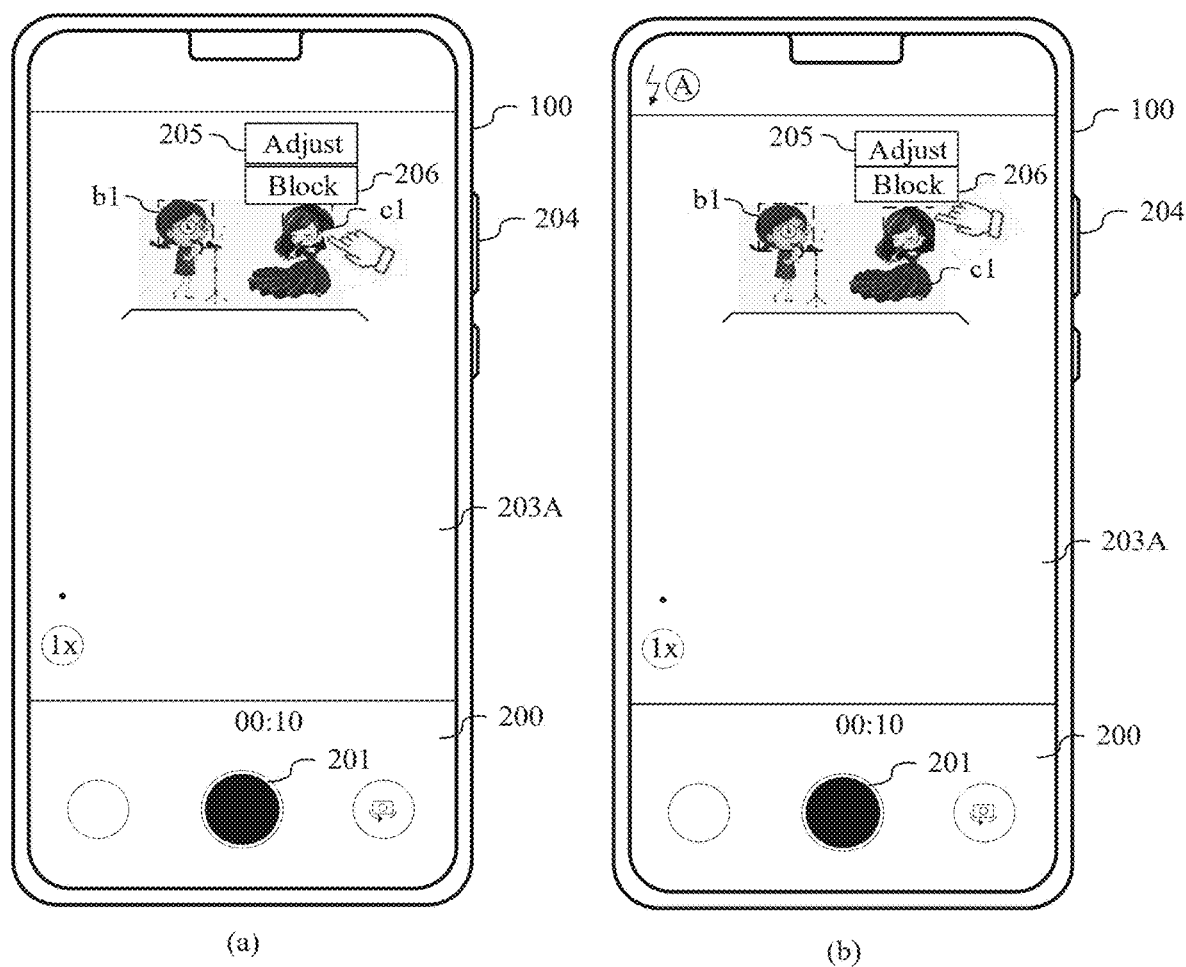
Figure 11:
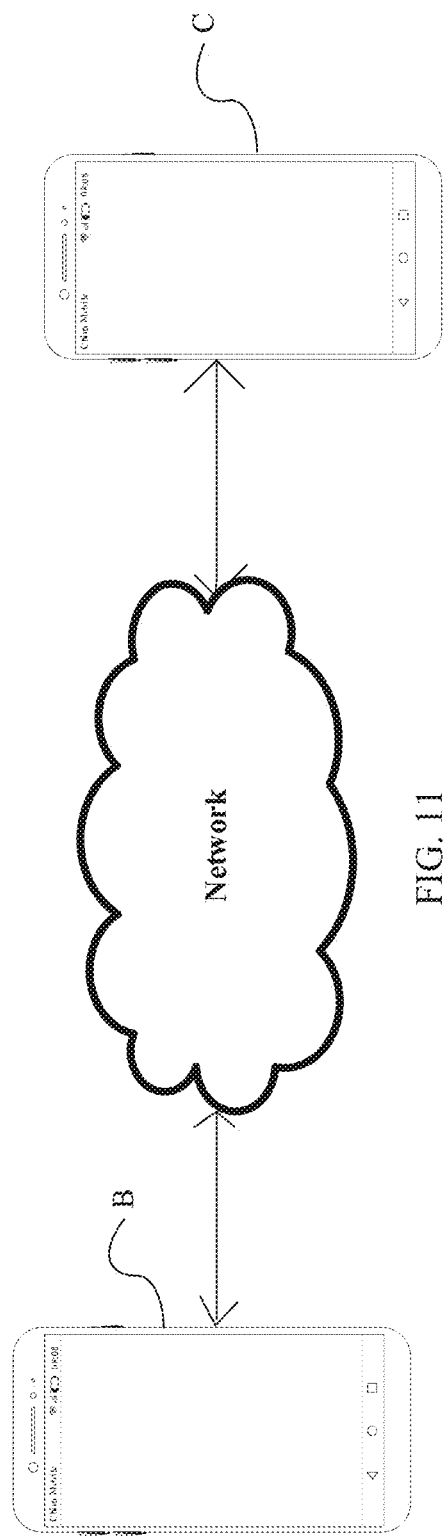
Figure 12:
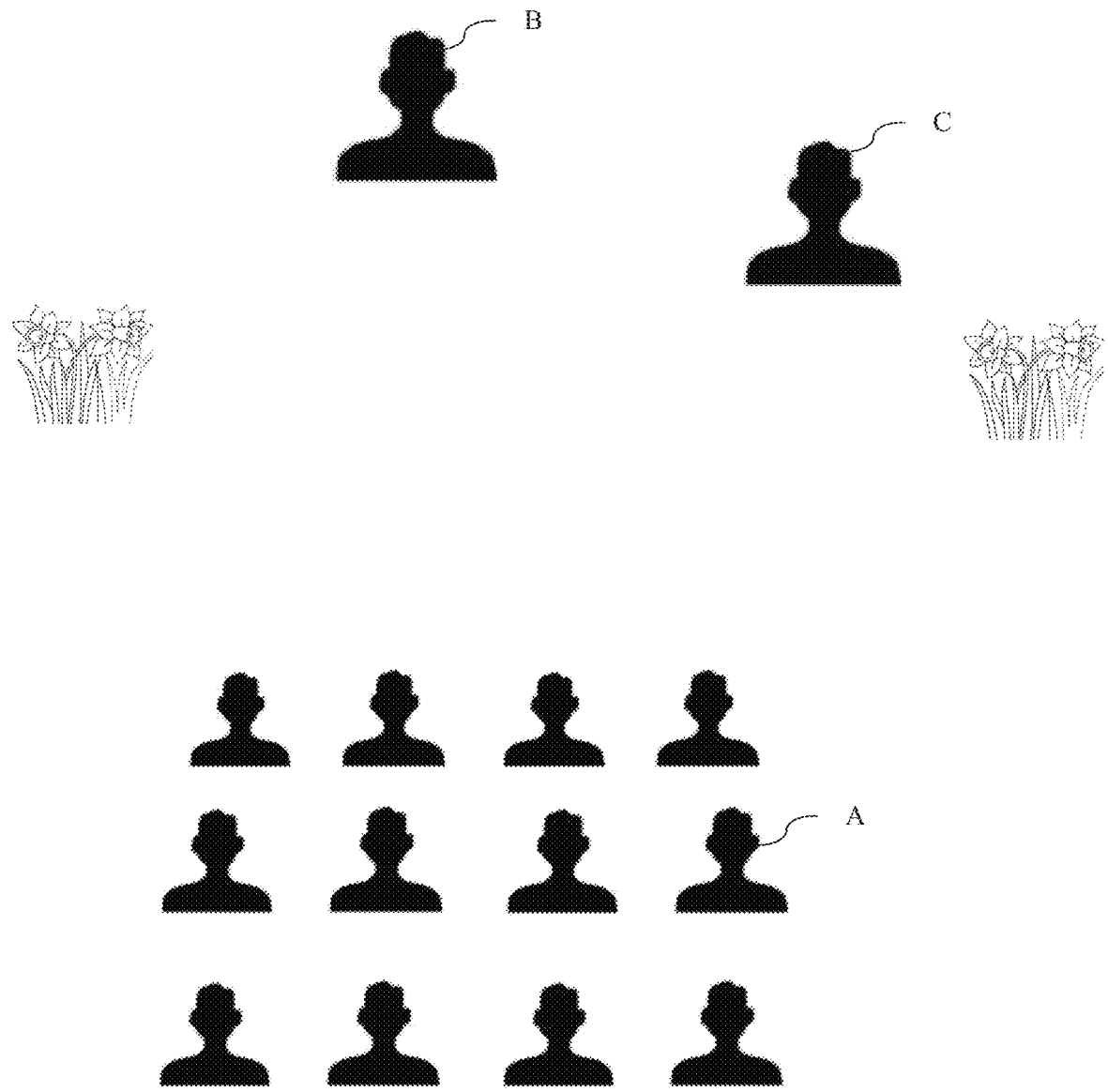
Figure 13:
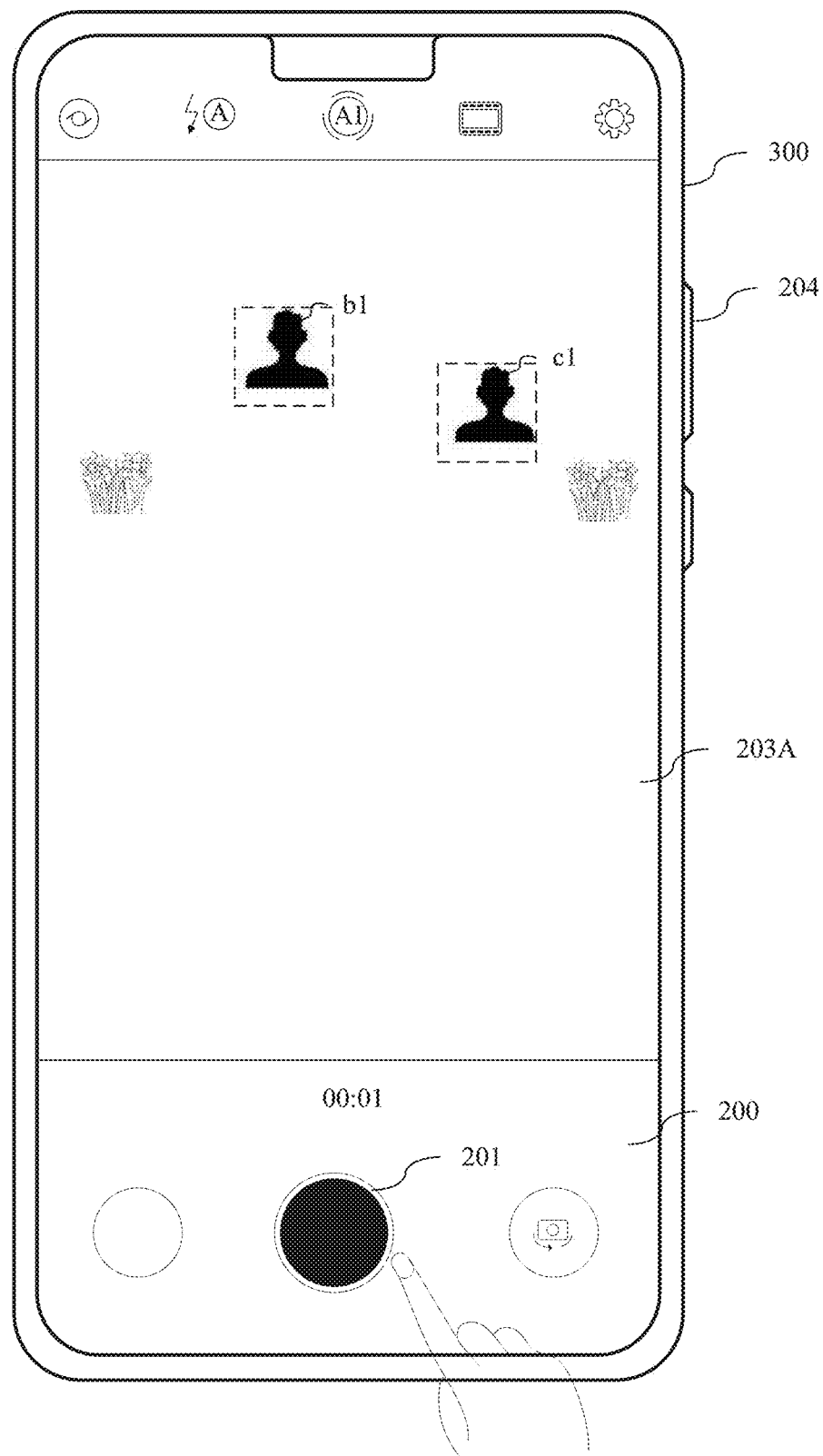
Figure 14:
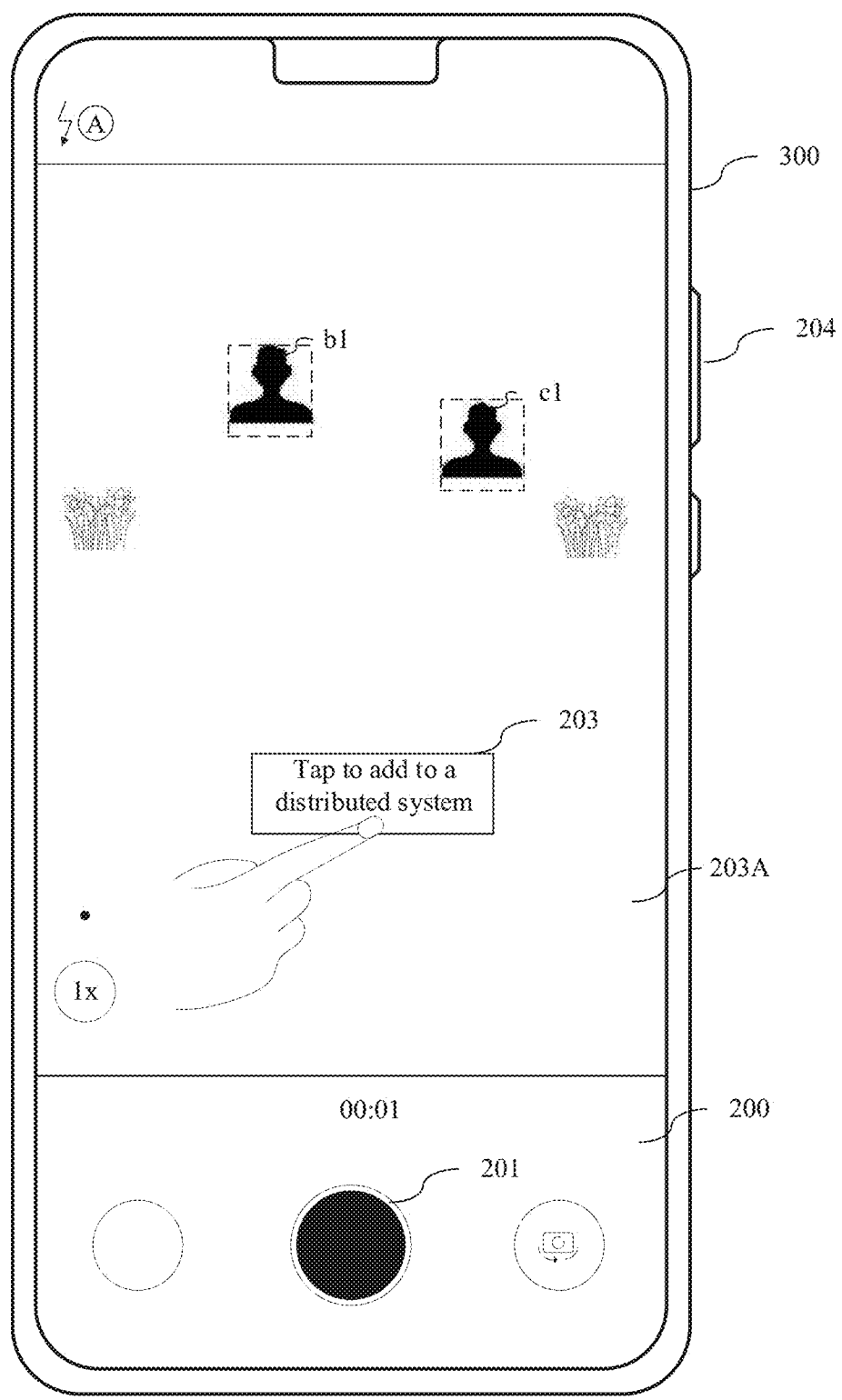
Figure 15:
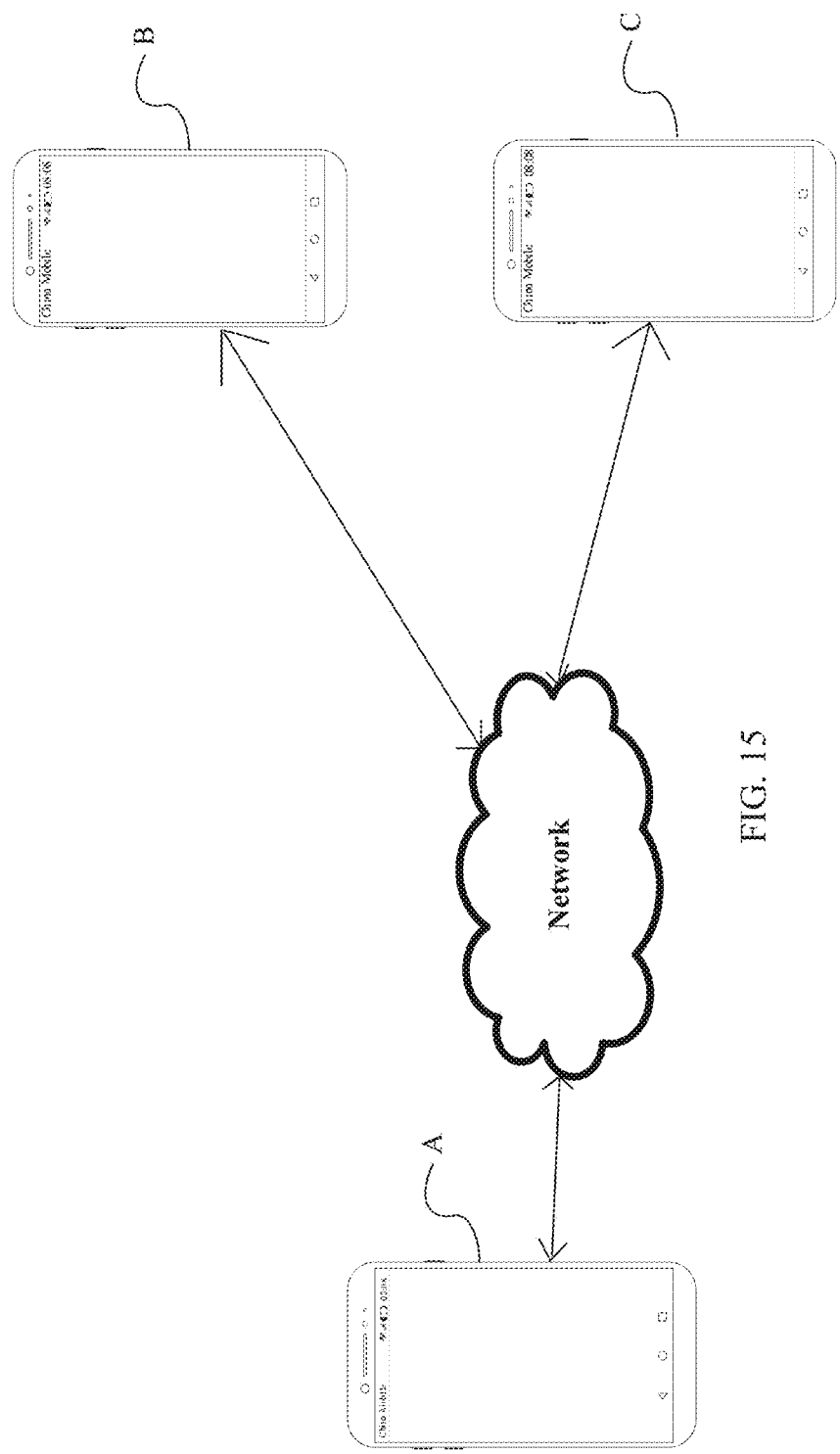
Figure 16:
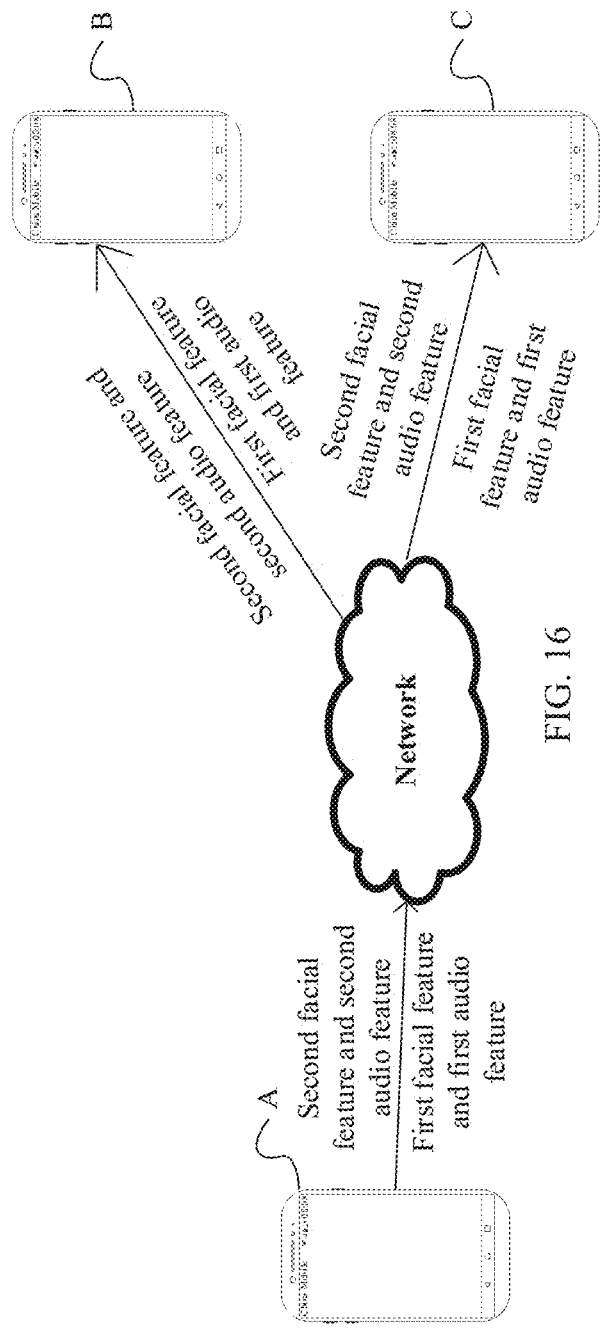
Figure 17:
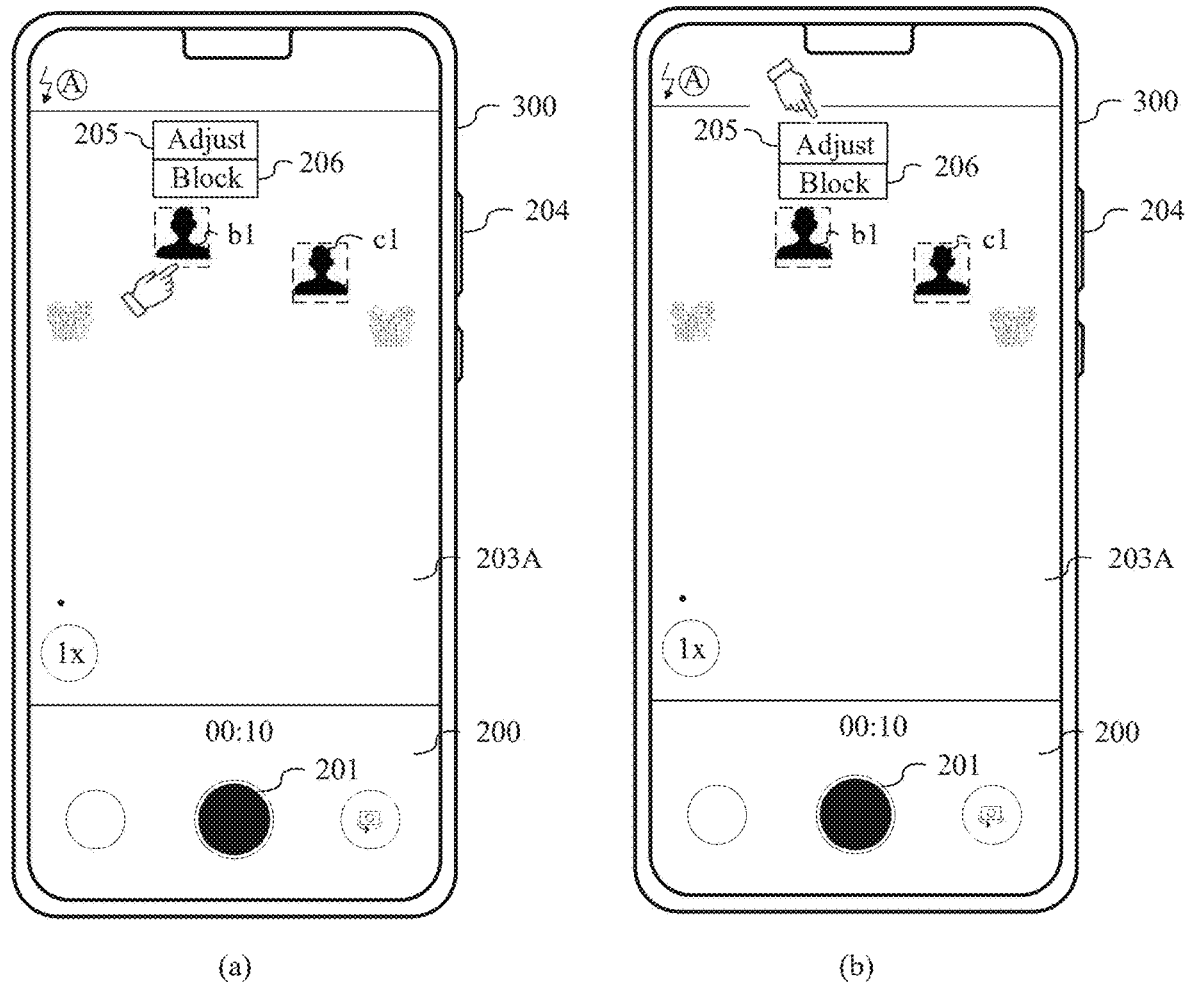
Figure 18:
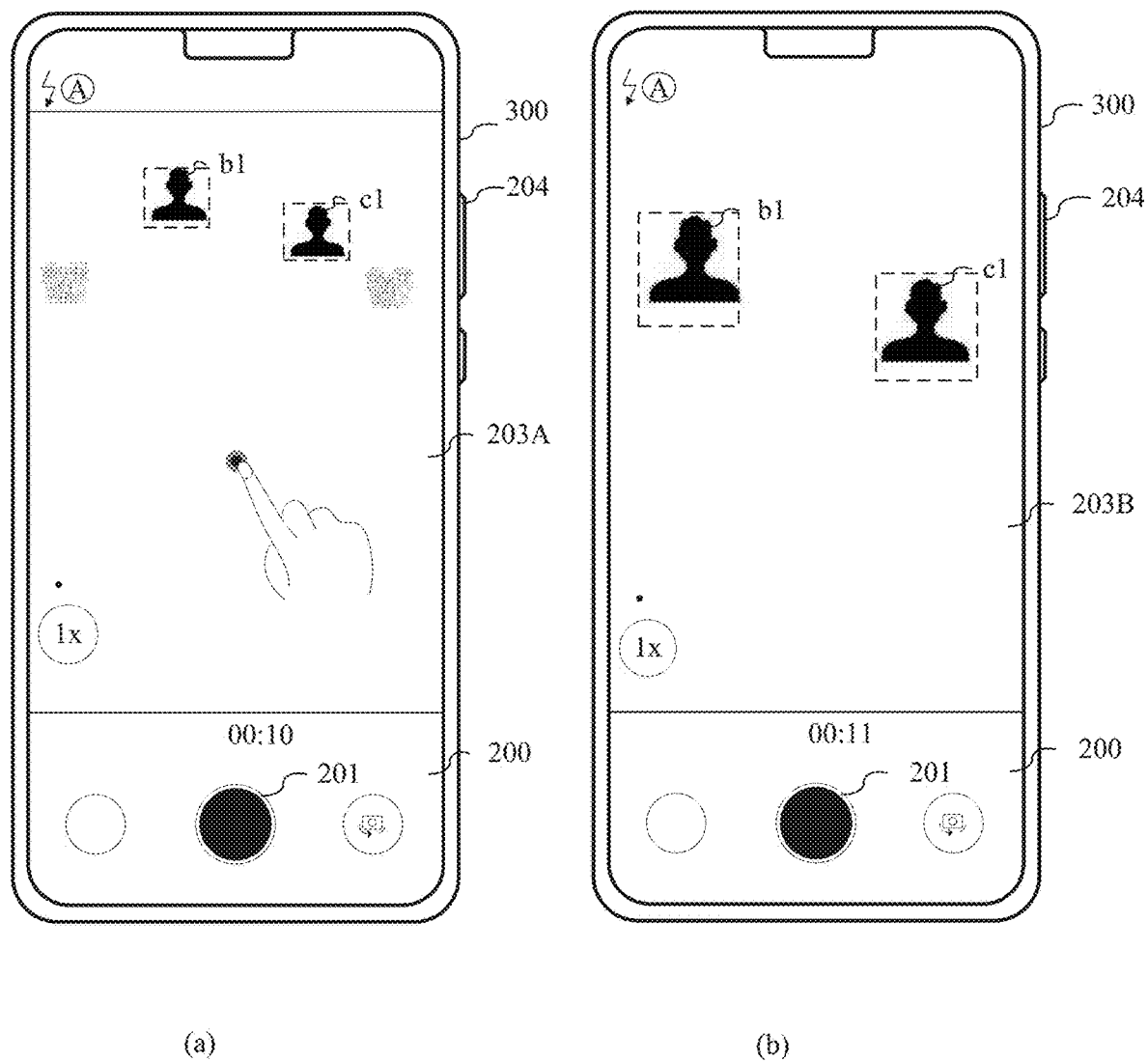
Figure 19:
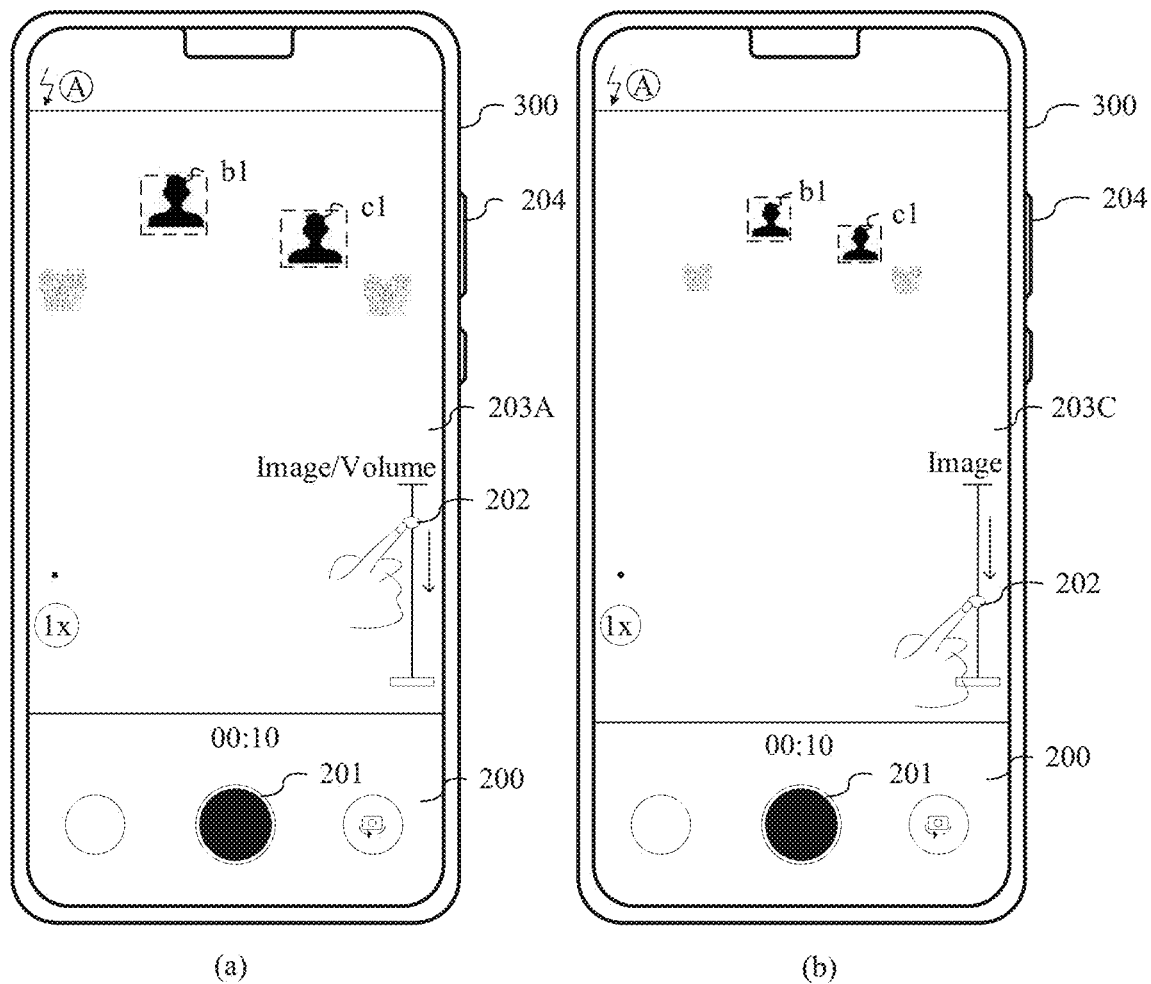

(a) in FIG. 4 is a schematic diagram 1 of inputting a zoom-in operation on a first shot image according to an embodiment of this application;

(b) in FIG. 4 is a schematic diagram 2 of a first shot image according to an embodiment of this application;

FIG. 5 is a schematic principle diagram of sound propagation according to an embodiment of this application;

(a) in FIG. 6 is a schematic diagram 1 of inputting a zoom-out operation on a first shot image according to an embodiment of this application;

(b) in FIG. 6 is a schematic diagram 3 of a first shot image according to an embodiment of this application;

FIG. 7 is a schematic principle diagram of recognizing a facial feature in a first shot image 203A based on a YOU) model according to an embodiment of this application;

FIG. 8 is a schematic diagram of a structure of an audio-visual recognition model according to an embodiment of this application;

(a) in FIG. 9 is a schematic diagram of inputting a selection operation on an image b1 of a performer B in a first shot image according to an embodiment of this application;

(b) in FIG. 9 is a schematic diagram of tapping a key on a side of an image b1 of a performer B in FIG. 11;

(a) in FIG. 10 is a schematic diagram of inputting a selection operation on an image c1 of a performer C in a first shot image according to an embodiment of this application;

(b) in FIG. 10 is a schematic diagram of tapping a key on a side of an image c1 of a performer C in FIG. 10;

FIG. 11 is a schematic diagram 1 of interaction of a distributed system according to an embodiment of this application;

FIG. 12 is a schematic diagram of a meeting scenario according to an embodiment of this application;

FIG. 13 is a schematic diagram 3 of a first shot image according to an embodiment of this application;

FIG. 14 is a schematic diagram of tapping a prompt key in a first shot image according to an embodiment of this application;

FIG. 15 is a schematic diagram 2 of interaction of a distributed system according to an embodiment of this application;

FIG. 16 is a schematic diagram 3 of interaction of a distributed system according to an embodiment of this application;

(a) in FIG. 17 is a schematic diagram of inputting a selection operation on an image b1 in a first shot image according to an embodiment of this application;

(h) in FIG. 17 is a schematic diagram of tapping a key on a side of an image b1 of a performer B in (a) in FIG. 17;

(a) in FIG. 18 is a schematic diagram 2 of inputting a zoom-in operation on a first shot image according to an embodiment of this application;

(b) in FIG. 18 is a schematic diagram 4 of a first shot image according to an embodiment of this application;

(a) in FIG. 19 is a schematic diagram 1 of inputting a zoom-out operation on a first shot image according to an embodiment of this application; and (b) in FIG. 19 is a schematic diagram of a third shot image according to an embodiment of this application.

DESCRIPTION OF EMBODIMENTS

The following clearly and completely describes the technical solutions in the embodiments of this application with reference to the accompanying drawings in the embodiments of this application. It is clear that the described embodiments are only a part rather than all of the embodiments of this application. All other embodiments obtained by a person of ordinary skill in the art based on the embodiments of this application without creative efforts shall fall within the protection scope of this application.

The character "/" in this application generally indicates an "or" relationship between the associated objects. For example, A/B may be understood as "A or B".

The terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include one or more features. In the description of the embodiments, unless otherwise specified, "a plurality of" means two or more.

In addition, the terms "include", "have", and any other variations thereof in the description of this application are intended to cover a non-exclusive inclusion. For example, a process, a method, a system, a product, or a device that includes a series of steps or modules is not limited to the listed steps or modules, but optionally further includes an unlisted step or module, or optionally further includes another inherent step or module of the process, the method, the product, or the device.

In addition, in the embodiments of this application, the term such as "example" or "for example" is used to represent giving an example, an illustration, or a description. Any embodiment or design described by "example" or "for example" in this application should not be construed as being preferred or more advantageous over other embodiments or designs. To be precise, the use of the term such as "example" or "for example" is intended to present a concept in a specific manner.

In daily life, to record valuable or interesting scenes, people use an electronic device with a video shooting function to record the valuable or interesting scenes for future playback.

A concert scenario is used as an example. As shown in (a) in FIG. 1, when a user A listens to a concert in a studio, the user A may watch a performer B and a performer C singing in the studio. If the user A is interested in a performance in which the performer B and the performer C are singing, the user A may open a camera app of a mobile phone 300. Further, as shown in (b) in FIG. 1, the mobile phone 300 may display a preview interface 200 of the camera app, and the user A may tap a recording key 201 on the preview interface 200 to collect and record video information in the studio. The video information recorded by the mobile phone 300 may include a first shot image 203A captured by a camera 353 and audio captured by a microphone in real time. If the user needs to zoom in or zoom out on the first shot image 203A on the preview interface 200 during recording, the user A may input a zoom-in or zoom-out operation on the preview interface 200. For example, the user A inputs a zoom-in operation. In response to the zoom-in operation, the mobile phone 300 may zoom in on the first shot image 203A on the preview interface 200 by adjusting a focal length of the camera 353, to present a closer capturing effect to the user A.

In this embodiment of this application, when the user A taps the recording key 201 on the preview interface 200 to trigger the mobile phone 300 to collect and record the video information in the studio, if the mobile phone 300 detects the zoom-in operation input by the user A on the preview interface 200 of the camera app, the mobile phone 300 may amplify volume of the recorded audio while scaling up a dimension of an image in the recorded first shot image 203A. If the mobile phone 300 detects the zoom-out operation input by the user A on the preview interface 200 of the camera app, the mobile phone 300 may decrease volume of the recorded audio while scaling down a dimension of an image in the recorded first shot image 203A.

In this way, when the mobile phone 300 subsequently plays the recorded video information, if the shot image in the video information is zoomed in on, the volume of the audio corresponding to the shot image is also increased. Correspondingly, if the shot image in the video information is zoomed out on, the volume of the audio corresponding to the shot image is also decreased, so that a dimension of the shot image in the video information matches the volume of the audio, thereby improving an audio-visual effect of the user on the recorded video information.

A video recording method provided in the embodiments of this application may be applied to an electronic device. The electronic device may be a mobile phone, a tablet computer, a notebook computer, an ultra-mobile personal computer (ultra-mobile personal computer, UMPC), a handheld computer, a netbook, a personal digital assistant (personal digital assistant, PDA), a wearable electronic device, a virtual reality device, or the like. This is not limited in the embodiments of this application.

For example, as shown in FIG. 2, the electronic device in the embodiments of this application may be a mobile phone 300. The mobile phone 300 is used as an example below to describe the embodiments in detail. It should be understood that the mobile phone 300 shown in the figure is merely an example of the electronic device, and the mobile phone 300 may include more or fewer components than those shown in the figure, may combine two or more components, or may have different component configurations.

As shown in FIG. 2, the mobile phone 300 includes a processor 301, an internal memory 321, an external memory interface 322, an antenna A, a mobile communication module 331, an antenna B, a wireless communication module 332, an audio module 340, a speaker 340A, a receiver 340B, a microphone 340C, a headset jack 340D, a display 351, a subscriber identity module (subscriber identification module, SIM) card interface 352, a camera 353, a button 354, a sensor module 360, a universal serial bus (universal serial bus, USB) interface 370, a charging management module 380, a power management module 381, and a battery 382. In some other embodiments, the mobile phone 300 may further include a motor, an indicator, and the like.

The processor 301 may include one or more processing units. For example, the processor 301 may include an application processor (application processor, AP), a modem, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), and the like. It should be noted that different processing units may be independent components, or may be integrated into one or more independent processors, or may be integrated into a same component with another module in the mobile phone 300. The modem is used as an example. The modem may be a processing unit independent of the processor 301, or may be integrated into a same device with another processing unit (for example, the AP, the ISP, or the GPU), or some or all functions of the modem and the mobile communication module 331 may be integrated into a same device.

The internal memory 321 may be configured to store data and/or at least one computer program, and the at least one computer program includes instructions. Specifically, the internal memory 321 may include a program storage area and a data storage area. The program storage area may store at least one computer program. The computer program may include an application (for example, Gallery or Contacts), an operating system (for example, an Android operating system or iOS operating system), another program, or the like. The data storage area may store at least one of data created in a process of using the mobile phone 300, data received from another device (for example, another mobile phone, a network device, or a server), data pre-stored before delivery, or the like. For example, the data stored in the internal memory 321 may be at least one piece of information such as an image, a file, or an identifier.

In some embodiments, the internal memory 321 may include a high-speed random access memory and/or a non-volatile memory. For example, the internal memory 321 includes one or more magnetic disk storage devices, a flash (Flash) memory, a universal flash storage (universal flash storage, UFS), and the like.

The processor 301 may invoke the one or more computer programs and/or data stored in the internal memory 321, so that the mobile phone 300 is enabled to implement one or more functions to meet requirements of the user. For example, the processor 301 may invoke the instructions and data stored in the internal memory 321, so that the electronic device is enabled to perform the video recording method provided in the embodiments of this application.

The external memory interface 322 may be configured to connect to an external storage card (for example, a micro SD card), to extend a storage capability of the mobile phone 300. The external storage card communicates with the processor 301 through the external memory interface 322, to implement a data storage function. For example, files such as images, music, and videos are stored in the external storage card.

In some embodiments, a buffer may be further disposed in the processor 301, and is configured to store instructions and/or data that need/needs to be cyclically used by the processor 301. If the processor 301 needs to use the instructions or the data again, the instructions or the data may be directly invoked from the buffer. This helps avoid repeated access, and reduce waiting time of the processor 301, so that system efficiency is improved. For example, the buffer may be implemented by using a cache.

The antenna A and the antenna B are configured to transmit and receive an electromagnetic wave signal. Each antenna in the mobile phone 300 may be configured to cover one or more communication frequency bands. Different antennas may be further multiplexed, to improve antenna utilization. For example, the antenna A may be multiplexed as a diversity antenna in a wireless local area network. In some other embodiments, the antenna may be used in combination with a tuning switch.

The mobile communication module 331 may be configured to implement communication between the mobile phone 300 and the network device based on a mobile communication technology (for example, 2G, 3G, 4G, or 5G) supported by the mobile phone 300. For example, the mobile communication technology supported by the mobile phone 300 may include at least one of GSM, G-PRS, CDMA, WCDMA, TD-SCDMA, NR, or the like. For example, the mobile phone 300 supports GSM. After the mobile phone 300 accesses a network through a cell provided by a BTS in a GSM communication system, when a network signal strength of the accessed cell is not lower than a decision threshold, that is, when the mobile phone 300 is in a network camping state, communication between the mobile phone 300 and the BTS may be implemented by using the mobile communication module 331. For example, the mobile communication module 331 may amplify a signal modulated by the modem, and then send an amplified signal to the network device through the antenna A. Alternatively, the mobile communication module 331 may receive, through the antenna A, a signal sent by the network device, amplify the signal, and then send an amplified signal to the modem. The modem demodulates the received signal into a low-frequency baseband signal, and then performs other corresponding processing. In some embodiments, the mobile communication module 331 may include a filter, a switch, a power amplifier, a low noise amplifier (low noise amplifier, LNA), and the like.

The wireless communication module 332 may provide a solution for wireless communication that is applied to the mobile phone 300 and that includes a wireless local area network (wireless local area network, WLAN) (for example, a wireless fidelity (wireless-fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The GNSS may include at least one of a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), a satellite based augmentation system (satellite based augmentation systems, SBAS), and/or the like. For example, the wireless communication module 332 may be one or more components integrating at least one communication processing module. The wireless communication module 332 may communicate with a corresponding device through the antenna B based on a wireless communication technology (for example, Wi-Fi, Bluetooth, FM, or NFC) supported by the wireless communication module 332.

The mobile phone 300 may implement an audio function such as music playing and recording through the audio module 340, the speaker 340A, the receiver 340B, the microphone 340C, the headset jack 340D, the AP, and the like. The microphone 340C may be a microphone array. The microphone array may include a plurality of microphones, and each of the microphones is configured to receive audio signals from different directions. The microphone array may implement a directional enhancement sound reception function and a directional suppression sound reception function.

The mobile phone 300 may implement a display function through the GPU, the display 351, the AP, and the like. The display 351 may be configured to display an image, a video, and the like. The display 351 may include a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the mobile phone 300 may include one or N displays 351, where N is a positive integer greater than 1.

The button 354 may include a power button, a volume button, and the like. The button 354 may be a mechanical button, or may be a virtual button, a virtual option, or the like. The mobile phone 300 may receive a button input, and generate a button signal input related to user setting and function control of the mobile phone 300.

The sensor module 360 may include one or more sensors. For example, the sensor module 360 includes an acceleration sensor 360A, a touch sensor 360B, a fingerprint sensor 360C, and the like. In some embodiments, the sensor module 360 may further include a pressure sensor, a gyroscope sensor, an environment sensor, a distance sensor, an optical proximity sensor, a bone conduction sensor, and the like.

The acceleration sensor (acceleration sensor, ACC sensor) 360A may collect accelerations of the mobile phone 300 in various directions (usually on three axes). When the mobile phone 300 is in a static state, a magnitude and a direction of gravity may be detected. In addition, the acceleration sensor 360A may be further configured to recognize a posture of the mobile phone 300, and is used in an application such as a pedometer or screen switching between a landscape mode and a portrait mode. In some embodiments, the acceleration sensor 360A may be connected to the processor 301 by using a microcontroller unit (micro controller unit, MCU), to help reduce power consumption of the mobile phone 300. For example, the acceleration sensor 360A may be connected to the AP and the modem by using the MCU. In some embodiments, the MCU may be a general intelligent sensor hub (Sensor hub).

The touch sensor 360B may also be referred to as a "touch panel". The touch sensor 360B may be disposed on the display 351. The touch sensor 360B and the display 351 constitute a touchscreen, which is also referred to as a "touch screen". The touch sensor 360B is configured to detect a touch operation on or near the touch sensor 360B. The touch sensor 360B may transfer the detected touch operation to the AP, to determine a type of a touch event. Then, the mobile phone 300 provides, by using the display 351 based on the determined type of the touch event, a visual output related to the touch operation. In some other embodiments, the touch sensor 360B may alternatively be disposed on a surface of the mobile phone 300 at a position different from that of the display 351.

The fingerprint sensor 360C is configured to collect a fingerprint. The mobile phone 300 may use a feature of the collected fingerprint to implement fingerprint-based unlocking, application lock access, fingerprint-based photographing, fingerprint-based call answering, and the like.

The SIM card interface 352 is configured to connect to a SIM card. The SIM card may be inserted into the SIM card interface 352 or removed from the SIM card interface 352, to implement contact with or separation from the mobile phone 300. The mobile phone 300 may support one or N SIM card interfaces, where N is a positive integer greater than 1. The SIM card interface 352 may support anoint) SIM card, a micro SIM card, a SIM card, and the like. A plurality of cards may be simultaneously inserted into a same SIM card interface 352. The plurality of cards may be of a same type or different types. The SIM card interface 352 may alternatively be compatible with different types of SIM cards. In some embodiments, the SIM card interface 352 may alternatively be compatible with an external storage card. The mobile phone 300 implements functions such as calling and data communication through the SIM card. In some embodiments, the mobile phone 300 may further use an eSIM, namely, an embedded SIM card. The eSIM card may be embedded into the mobile phone 300, and cannot be separated from the mobile phone 300.

The camera 353 may input a collected image signal to the processor 301, and the processor 301 may process the image signal into an image frame. The camera 353 may be a time-of-flight (time of flight, TOF) camera. In a spatial coordinate system in which the TOF camera is an origin of coordinates, the TOF camera may collect spatial coordinates of a photographed object body, to determine a direction of the photographed object body.

The USB interface 370 is an interface conforming to the USB standard specification, and may be specifically a mini USB interface, a micro USB interface, a USB Type-C interface, or the like. The USB interface 370 may be configured to connect to a charger to charge the mobile phone 300, or may be configured to perform data transmission between the mobile phone 300 and a peripheral device, or may be configured to connect to a headset for playing audio through the headset. The interface may be further configured to connect to another electronic device such as an AR device.

It may be understood that an interface connection relationship between the modules shown in the embodiments of this application is merely an example for description, and does not constitute a limitation on the structure of the mobile phone 300. In some other embodiments of this application, the mobile phone 300 may alternatively use an interface connection manner different from that in the foregoing embodiment, or use a combination of a plurality of interface connection manners.

The charging management module 380 is configured to receive a charging input from a charger. The charger may be a wireless charger or a wired charger. The power management module 381 is configured to connect the battery 382, the charging management module 380, and the processor 301. The power management module 381 receives an input from the battery 382 and/or the charging management module 380, and supplies power to modules such as the processor 301. In some embodiments, the power management module 381 may be further configured to monitor parameters such as a battery capacity, a quantity of battery cycles, and a battery health status (leakage of electricity and impedance).

It should be understood that a structure of the mobile phone 300 shown in FIG. 2 is merely an example. The mobile phone 300 in the embodiments of this application may have more or fewer components than those shown in the figure, may combine two or more components, or may have different component configurations. Various components shown in the figure may be implemented by using hardware including one or more signal processors and/or application-specific integrated circuits, software, or a combination of hardware and software.

It should be noted that the solutions in the embodiments of this application may be further applied in another electronic device, and a corresponding name may also be replaced with a name of a corresponding function in the another electronic device.

The following describes in detail a video recording method according to an embodiment of this application with reference to FIG. 3. As shown in FIG. 3, a video recording method provided in an embodiment of this application is applied to a first electronic device, and specifically includes the following steps.

S1002: Record a first shot image in response to a first operation of a user on a preview interface of an application, and record audio corresponding to the first shot image at first volume.

S1004: Capture a second shot image and audio corresponding to the second shot image in response to a zoom-in operation of the user on the first shot image, where the first shot image and the second shot image are consecutive.

S1006: Record the second shot image, and record the audio corresponding to the second shot image at second volume.

The second volume is greater than the first volume. Alternatively, a sound amplification ratio corresponding to the second volume is greater than a sound amplification ratio of the first volume, and the sound amplification ratio is a ratio of volume output by the first electronic device to captured volume.

For example, the first electronic device is a mobile phone 300. Volume output by the mobile phone 300 may be volume output by a headset or a speaker, and volume captured by the mobile phone 300 may be volume captured by a microphone. In a design, the sound amplification ratio may correspond to an amplification ratio of a power amplifier of the mobile phone 300.

The video recording method 100 in this embodiment of the present invention is described in detail below with reference to different examples.

Specifically, a first implementation of the video recording method is as follows.

Generally, an application that has a video recording function, such as a camera app, a WeChat app, or a TikTok app, may be installed on the mobile phone 300. The camera app is used as an example below With reference to FIG. 1 to FIG. 8, the following describes in detail how a user triggers, by using the camera app, the mobile phone 300 to collect and record video information in the first implementation.

A concert scenario is still used as an example. When a user A listens to a concert in a studio, the user A may open a camera app of a mobile phone to record video information. For example, in response to an operation of opening the camera app by the user A, the mobile phone 300 may invoke a camera 353 to start capturing the first shot image, so as to display the captured first shot image on a preview interface of the camera app. As shown in (b) in FIG. 1, a preview interface 200 of the camera app includes the first shot image 203A, and the first shot image 203A includes an image of a first photographed object and an image of a second photographed object. For example, the first shot image 203A includes an image b1 of a performer B and an image c1 of a performer C.

For example, in the first shot image 203A of the camera app, a dimension of the image b1 of the performer B may be a first display dimension, and a dimension of the image c1 of the performer C may be a second display dimension. The first display dimension may be a dimension of an area occupied by the image b1 of the performer B, and the second display dimension may be a dimension of an area occupied by the image c1 of the performer C. In addition, the first display dimension may alternatively be a dimension z1×y1 of a rectangular frame of the image b1 circled in (b) in FIG. 1, and the dimension of the image c1 of the performer C may alternatively be a dimension x2×y2 of a rectangular frame of the image c1 circled in (b) in FIG. 1.

In the following, description is given by using an example in which the first display dimension is the dimension x1×y1 of the rectangular frame of the image b1 circled in (b) in FIG. 1, and the second display dimension is the dimension x2×y2 of the rectangular frame of the image c1 circled in (b) in FIG. 1. For example, the first display dimension x1×y1 may be 8 mm×6 mm, 8 mm×12 mm, or the like, and the second display dimension x2×y2 may be 8 mm×10 mm, 10 mm×16 mm, or the like. This is not limited herein.

Figure 1:
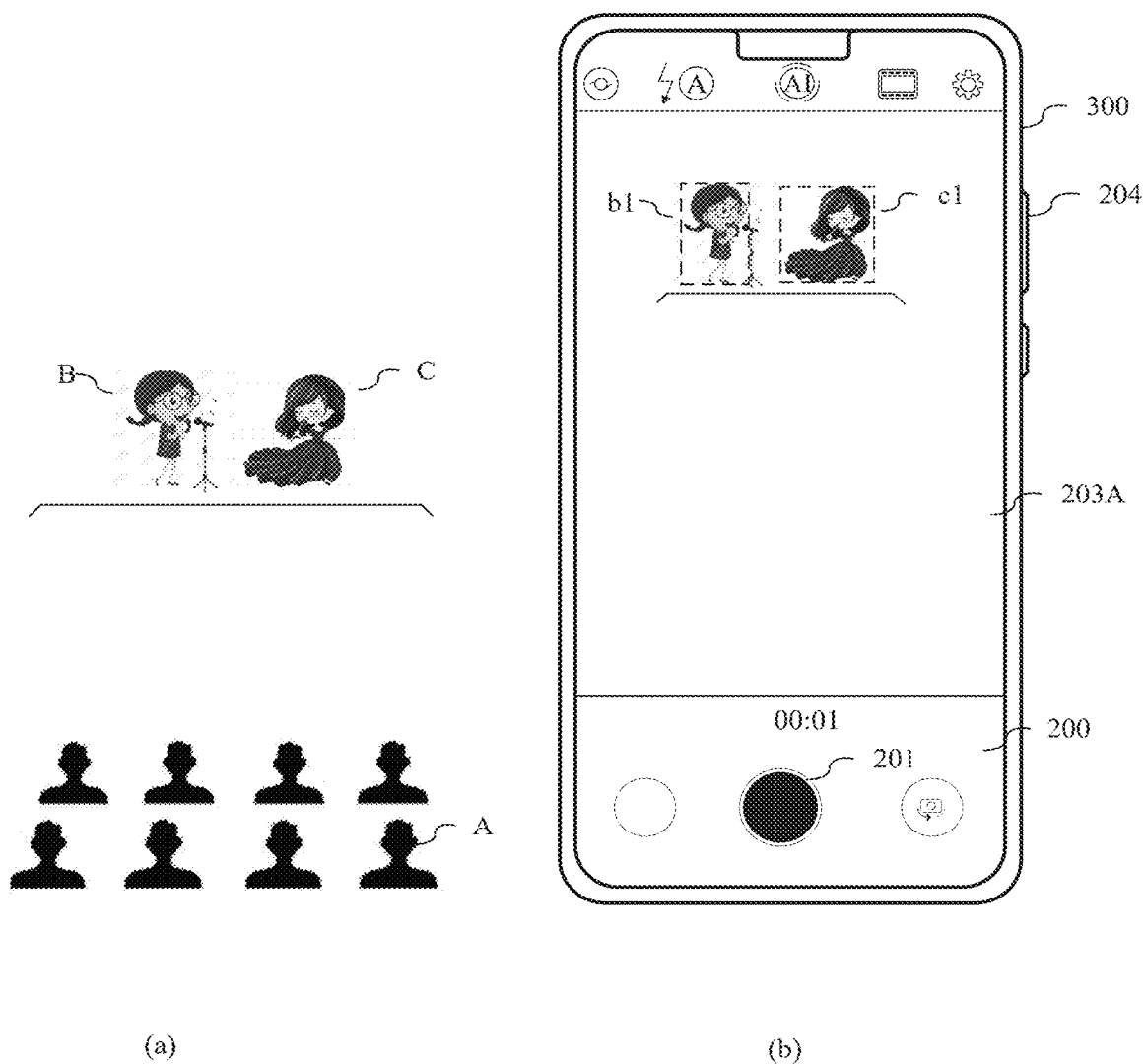

Still refer to (b) in FIG. 1. The preview interface 200 of the camera app is further configured with a recording key 201, and the user A may input a touch operation on the recording key 201. The mobile phone 300 may start recording video information in response to the touch operation performed by the user A on the recording key 201. For example, the video information may include the first shot image 203A captured by the camera 353 and the audio corresponding to the first shot image 203A captured by a microphone 304C. Further, the audio captured by the microphone 304C may include audio of the performer B and audio of the performer C. First volume of the audio of the performer B recorded by the mobile phone 300 is V1, second volume of the recorded audio of the performer C is V2, and a sound amplification ratio is R0. For example, the first volume V1 may be 30 db, 40 db, or the like, and the second volume V2 may be 35 db, 45 db, or the like. This is not limited herein. The sound amplification ratio R0 may be a ratio/rate of the first volume V1 to the volume of the audio captured by the microphone of the mobile phone 300. The sound amplification ratio R0 may alternatively be a corresponding amplification ratio of the current power amplifier of the mobile phone 300.

It may be understood that, when a volume adjustment button 204 of the mobile phone 300 is not adjusted, the first volume V1 of the audio of the performer B recorded by the mobile phone 300 is positively correlated with the volume of the audio emitted by the performer B. For example, larger volume of the audio emitted by the performer B indicates larger first volume V1 of the recorded audio of the performer B. Otherwise, smaller volume of the audio emitted by the performer B indicates smaller first volume V1 of the recorded audio of the performer B. Similarly, the second volume V2 of the audio of the performer C recorded by the mobile phone 300 is also positively correlated with the volume of the audio emitted by the performer C. Details are not described herein again.

Subsequently, when watching the first shot image 203A, the user A visually feels that the performer B and the performer C are far away from the user A, and/or the user A aurally feels that the performer B and the performer C are far away from the user A, and an audio-visual effect is poor. As shown in (a) in FIG. 4, the user A may input a zoom-in operation at any position on the preview interface 200. The zoom-in operation may be a touch and hold operation. In addition, the touch and hold operation may be replaced with an operation such as a spread gesture, a double-tap operation, or dragging up a scroll bar (not shown in FIG. 4), which is not limited herein.

As shown in (b) in FIG. 4, after detecting the zoom-in operation input by the user A, the mobile phone 300 captures the second shot image 203B and records the second shot image 203B based on a second focal length F2. Then, the second shot image 203B is displayed on the preview interface 200. The second shot image 203B may alternatively include an image b2 of the performer B in a third display dimension x1'×y1' and an image c2 of the performer C in a fourth display dimension x2'×y2'. The third display dimension x1'×y1' is greater than the first display dimension x1×y1, and the fourth display dimension x2'×y2' is greater than the second display dimension x2×y2. For example, the third display dimension x1'×y1' may be 12 mm×9 mm, 12 mm×16 mm, or the like, and the fourth display dimension x2'×y2' may be 12 mm×15 mm, 15 mm×24 mm, or the like. This is not limited herein.

In addition, after detecting the zoom-in operation input by the user A, the mobile phone 300 captures the audio corresponding to the second shot image 203B. In a possible implementation, the audio corresponding to the second shot image 203B is audio captured when the second shot image 203B is captured. Specifically, the audio captured when the second shot image 203B is captured may include the audio of the performer B in the second shot image 203B, or may include audio of a sound source outside the second shot image 203B. This is not limited herein. When recording the audio corresponding to the second shot image 203B, the mobile phone 300 may increase volume of the recorded audio. For example, the first volume V1 of the audio of the performer B is increased to third volume V1', and the second volume V2 of the recorded audio of the performer C is increased to fourth volume V2'. It may be understood that the third volume V1' is greater than the first volume V1, and the fourth volume V2' is greater than the second volume V2. For example, the third volume V1' may be 50 db, 60 db, or the like, and the fourth volume V2' may be 55 db, 70 db, or the like. This is not limited herein.

When the mobile phone 300 plays the recorded video information, the second shot image 203B is displayed. It may be understood that the second shot image 203B includes: the image b2 of the performer B that is displayed in the third display dimension x1'×y1' greater than the first display dimension x1×y1, and the image c2 of the performer C that is displayed in the fourth display dimension x2'×y2' greater than the second display dimension x2×y2. Therefore, when watching the second shot image 203B, the user A visually feels that the performer B and the performer C are closer to the user A.

Correspondingly, when playing the audio corresponding to the second shot image 203B in the video information, the mobile phone 300 increases the sound amplification ratio to R1, plays the audio of the performer B at the third volume V1' higher than the first volume V1, and plays the audio of the performer C at the fourth volume V2' higher than the second volume V2. In this way, the user A can not only visually feel that the performer B and the performer C are closer to the user A, but also can aurally feel that the performer B and the performer C are closer to the user A, thereby improving an audio-visual effect of the recorded video information.

The following specifically describes how the mobile phone 300 increases volume of the recorded audio corresponding to the second shot image 203B Ether detecting the zoom-in operation.

For example, when capturing the first shot image 203A, the mobile phone 300 may capture the first shot image 203A based on a first focal length F1. Subsequently, when receiving the zoom-in operation input by the user A on the preview interface 200, the mobile phone 300 may capture the second shot image 203B based on the second focal length F2. After capturing the second shot image 203B, the mobile phone 300 may determine a dimension of an image of a photographed object in the second shot image 203B based on the second focal length F2.

For example, when capturing the second shot image 203B, the mobile phone 300 obtains an actual distance between the camera 353 and the photographed object, and an actual dimension of the photographed object. Further, the mobile phone 300 may determine the dimension of the image of the photographed object in the second shot image 203B according to a formula $D_2=D_1 \times F2/R$. R is the actual distance between the camera 353 and the photographed object, $D_1$ is the actual dimension of the photographed object, F2 is the second focal length, and $D_2$, is a display dimension of the photographed object in the second shot image 203B. When the image of the photographed object in the second shot image 203B includes the image b2 of the performer B and the image c2 of the performer C, the mobile phone 300 may determine the third display dimension x1'×y1' of the image b2 of the performer B and the fourth display dimension x2'×y2' of the image c2 of the performer C according to the formula $D_2=D_1 \times F2/R$.

When the mobile phone 300 detects the zoom-in operation input by the user A on the preview interface 200, in addition to zooming in on the first shot image 203A, the mobile phone 300 may further increase the volume of the recorded audio corresponding to the second shot image 203B based on the first focal length F1 and the second focal length F2.

Specifically, the mobile phone 300 may determine the second volume based on the first volume and a zoom ratio. For example, the mobile phone 300 increases the volume of the recorded audio according to a formula $$V' = V \times \frac{F2}{F1}.$$

V is volume of the recorded audio, the volume V is increased to volume V', and $$\frac{F2}{F1}$$

is the zoom ratio. Further, the first volume V1 of the recorded audio of the performer B is increased to the third volume V1', and the second volume V2 of the recorded audio of the performer C is increased to the fourth volume V2'. The third volume V1' satisfies $$V1' = V \times \frac{F2}{F1},$$

and the fourth volume V2' satisfies $$V2' = V2 \times \frac{F2}{F1}.$$

In some other embodiments, the mobile phone 300 may further increase the volume of the recorded audio corresponding to the second shot image 203B based on an image zoom-in ratio of any photographed object in the first shot image 203A.

For example, after capturing the first shot image 203A, the mobile phone 300 may detect a dimension of any photographed object in the first shot image 203A. For example, the photographed object is the performer B. The mobile phone 300 may detect the first display dimension x1×y1, in the first shot image 203A, of the image b1 of the performer B based on a YOLO (you only live once, YOLO) model. Similarly, after capturing the second shot image 203B, the mobile phone 300 may also detect the third display dimension x1'×y1', in the second shot image 203B, of the performer B according to the foregoing method. In this case, an image zoom-in in ratio B of the image b2 of the performer B in the second shot image 203B is $$B = \frac{x1' \times y1'}{x1 \times y1}.$$

In addition, the mobile phone 300 may further obtain an image zoom-in ratio of the image c1 of the performer C according to a same method, and details are not described herein again. It may be understood that the image zoom-in ratio of the image c1 of the performer C is the same as that of the image b1 of the performer B.

Further, the mobile phone 300 may determine increased volume V' based on the image zoom-in ratio B. For example, the mobile phone 300 may increase the volume of the recorded audio corresponding to the second shot image 203B according to a formula $$V' = V \times \frac{x1' \times y1'}{x1 \times y1}.$$

V is the volume of the recorded audio corresponding to the first shot image 203A, the volume V is increased to volume V', and $$\frac{x1' \times y1'}{x1 \times y1}$$

is the image zoom-in ratio. Further, the first volume V1 of the audio of the performer B is increased to the third volume and the second volume V2 of the audio of the performer C is increased to the fourth volume V2'. The third volume V1' satisfies $$V' = V \times \frac{x1' \times y1'}{x1 \times y1},$$

and the fourth volume V2' satisfies $$V2' = V2 \times \frac{x1' \times y1'}{x1 \times y1}.$$

In some other embodiments, the mobile phone 300 may further increase the volume of the recorded audio corresponding to the second shot image 203B with reference to the zoom ratio and the image zoom-in ratio.

For example, the mobile phone 300 may increase the volume of the recorded audio according to a formula $$V = V + 20\log\frac{F2}{F1} \times \frac{x1 \times y1}{x1' \times y1'}.$$

V is the volume of the recorded audio corresponding to the first shot image 203A, the volume V is increased to volume V', $$\frac{F2}{F1}$$

is the zoom ratio, and $$\frac{x1 \times y1}{x1' \times y1'}$$

is a reciprocal of the image zoom-in ratio. Further, the first volume V1 of the audio of the performer B is increased to the third volume V1', and the second volume V2 of the audio of the performer C is increased to the fourth volume V2'. The third volume V1' satisfies $$V1' = V1 + 20\log\frac{F2}{F1} \times \frac{x1 \times y1}{x1' \times y1'},$$

and the fourth volume V2' satisfies $$V2' = V2 + 20\log\frac{F2}{F1} \times \frac{x1 \times y1}{x1' \times y1'},$$

With reference to a specific example, the following describes in detail a principle of increasing, by the mobile phone 300, the volume of the recorded audio of the performer B according to a formula $$V1' = V1 + 20\log\frac{F2}{F1} \times \frac{x1 \times y1}{x1' \times y1'}.$$

Usually, a larger sound propagation distance indicates smaller volume of the audio, and otherwise, a smaller sound propagation distance indicates larger volume of the audio. As shown in FIG. 5, FIG. 5 includes a sound source M, a position P1, and a position P2. A distance between the position P2 and the sound source M is d1, and a distance between the position P1 and the sound source M is d2. A sound emitted by the sound source M may be transmitted to the position P1 and the position P2 in sequence. If volume of audio received at the position P2 is Y, volume Y' of the sound emitted by the sound source M and propagated to the position P1 may be obtained according to a formula $$Y = Y' + 20\log\frac{d1}{d2}.$$

In a first implementation of this embodiment of this application, the third display dimension x1'×y1' of the image b2 of the performer B captured based on the second focal length F2 is greater than the first display dimension x1×y1 of the image b1 of the performer B captured based on the first focal length F1. If the image b2 of the performer B is displayed on the preview interface 200 of the camera app in the third display dimension x1'×y1', the user A can visually feel that the image of the performer B is closer to the user A (a distance does not change in essence). In this way, a relationship between a dimension of the recorded image of the performer B and volume of the recorded audio of the performer B may be simulated based on a relationship between a propagation distance of the sound and the volume.

Specifically, the formula $$V' = V + 20\log\frac{F2}{F1} \times \frac{x1 \times y1}{x1' \times y1'}$$

may be simulated according to the formula.

$$Y = Y' + 20\log\frac{d1}{d2}.$$

Further, the mobile phone 300 may increase the volume of the recorded audio corresponding to the second shot image 203B according to a formula $$V' = V + 20\ \log\frac{F2}{F1} \times \frac{x1 \times y1}{x1' \times x1'}.$$

In some other embodiments, when the mobile phone 300 detects the zoom-in operation input by the user A on the preview interface 200, in addition to zooming in on the first shot image 203A, the mobile phone 300 may further increase the sound amplification ratio. Specifically, the mobile phone 300 may adjust the sound amplification ratio based on a change of the focal length and/or a change of the display dimension. In this way, volume of audio corresponding to the zoom-in operation is adjusted based on an adjusted sound amplification ratio R1. For a specific method for adjusting the sound amplification ratio, V' in the formula may be replaced with R1, and V may be replaced with R0 to obtain the adjusted sound amplification ratio R1. For specific details, refer to content of the formula, which is not described herein again.

In addition, in the first implementation of this embodiment of this application, description is given by using an example in which the volume of the recorded audio corresponding to the second shot image 203B is increased when the zoom-in operation is detected. In another embodiment, as shown in (a) in FIG. 6 and (b) in FIG. 6, the mobile phone 300 may further decrease volume of recorded audio corresponding to a third shot image 203C according to the foregoing method when detecting a zoom-out operation. After the zoom-out operation is detected, the third shot image 203C is captured based on a third focal length F3, and the third shot image 203C is displayed on the preview interface 200. For example, the third shot image 203C includes: an image b3 of the performer B displayed in a fifth display dimension x1"×y1", and an image c3 of the performer C displayed in a sixth display dimension x2"×y2". The fifth display dimension x1"×y1" is less than the first display dimension x1×y1, and the sixth display dimension x2"×y2" is less than the second display dimension x2×y2. In addition, the mobile phone 300 decreases the first volume V1 of the recorded audio of the performer B to the fifth volume V1", and decreases the second volume V2 of the recorded audio of the performer C to the sixth volume V2".

When the recorded video information is subsequently played, the mobile phone 300 displays the third shot image 203C. The third shot image 203C includes: the image b3 of the performer B that is displayed in the fifth display dimension x1"×y1" less than the first display dimension x1×y1, and the image c3 of the performer C that is displayed in the sixth display dimension x2"×y2" less than the second display dimension x2×y2. In this way, the user A visually feels that the performer B and the performer C are farther away from the user A.

Correspondingly, when playing the audio corresponding to the third shot image 203C in the video information, the mobile phone 300 plays the audio of the performer B at the fifth volume V1" lower than the first volume V1, and plays the audio of the performer C at the sixth volume V2" lower than the second volume V2. In this way, the user A can not only visually feel that the performer B and the performer C are farther away the user A, but also can aurally feel that the performer B and the performer C are farther away the user A, thereby improving an audio-visual effect of the recorded video information.

The following specifically describes how the mobile phone 300 decreases volume of the recorded audio corresponding to the third shot image 203C after detecting the zoom-out operation.

For example, when capturing the first shot image 203A, the mobile phone may capture the first shot image 203A based on a first focal length F1. Subsequently, when receiving the zoom-out operation input by the user A on the preview interface 200, the mobile phone 300 may capture the third shot image 203C based on the third focal length F3. After capturing the third shot image 203C, the mobile phone 300 may determine a dimension of the third shot image 203C based on the third focal length F3 according to a same method.

In some embodiments, when the mobile phone 300 detects the zoom-out operation input by the user A on the preview interface 200, in addition to displaying the third shot image 203C, the mobile phone 300 may further decrease the volume of the recorded audio based on the first focal length F1 and the third focal length F3. For example, the mobile phone 300 may decrease the volume of the recorded audio corresponding to the third shot image 203C according to a formula $$V'' = V \times \frac{F3}{F1}.$$

V is the volume of the recorded audio corresponding to the first shot image 203A, the volume V is decreased to volume V", and $$\frac{F3}{F1}$$

is the zoom ratio.

In some other embodiments, the mobile phone 300 may further decrease the volume of the recorded audio corresponding to the third shot image 203C based on an image zoom-out ratio, Specifically, the mobile phone 300 may obtain the image zoom-out ratio according to a same method, and details are not described herein.

Further, the mobile phone 300 may determine decreased volume V' based on the image zoom-out ratio. For example, the mobile phone 300 may decrease the volume of the recorded audio according to a formula $$V'' = V \times \frac{x1'' \times y1''}{x1 \times x1}.$$

V is the volume of the recorded audio corresponding to the first shot image 203B, the volume V is decreased to volume V", and $$\frac{x1'' \times y1''}{x1 \times x1}$$

is the image zoom-out ratio.

In some other embodiments, the mobile phone 300 may further decrease the volume of the recorded audio corresponding to the third shot image 203C with reference to the first focal length F1, the third focal length F3, and the image zoom-out ratio. For example, the mobile phone 300 may decrease the volume of the recorded audio corresponding to the third shot image 203C according to a formula $$V'' = V + 20 \log \frac{F3}{F1} \times \frac{x1 \times y1}{x1'' \times x1''}.$$

V is the volume of the recorded audio corresponding to the first shot image 203A, the volume V is decreased to volume V", $$\frac{F3}{F1}$$

is the zoom ratio, and $$\frac{x1 \times y1}{x1'' \times x1''}$$

is a reciprocal of the image zoom-out ratio. A principle of decreasing the volume of the recorded audio corresponding to the third shot image 203C by the mobile phone 300 according to the formula $$V'' = V + 20 \log \frac{F3}{F1} \times \frac{x1 \times y1}{x1'' \times x1''}$$

is the same as the foregoing principle, and details are not described herein again.

In some other embodiments, when the mobile phone 300 detects the zoom-out operation input by the user A on the preview interface 200, in addition to zooming out on the first shot image 203A, the mobile phone 300 may further obtain a sound amplification ratio R2. Further, the mobile phone 300 may obtain volume V" of the recorded audio based on captured original volume V0" of the audio corresponding to the third shot image 203C and the sound amplification ratio R2. V" is less than the volume V. A method for adjusting a sound amplification ratio corresponding to the zoom-out operation may be the same as a method for adjusting a sound amplification ratio corresponding to the zoom-in operation. The mobile phone 300 may adjust the sound amplification ratio based on a change of the focal length and/or a change of the display dimension. In this way, volume of audio corresponding to the zoom-out operation is adjusted based on an adjusted sound amplification ratio R2. For a specific method for adjusting the sound amplification ratio, V" in the formula may be replaced with R2, and V may be replaced with R0 to obtain the adjusted sound amplification ratio R2. For specific details, refer to content of the formula, which is not described herein again.

In addition, an example in which the user A inputs the zoom-in operation on the preview interface 200 of the mobile phone 300 is still used to describe a manner in which the mobile phone 300 plays the video information. If the mobile phone 300 is in a headset mode when recording the video information, the mobile phone 300 may play the recorded video information while recording the video information. For example, the mobile phone 300 may increase the volume of the recorded audio corresponding to the second shot image 203B according to the foregoing method while displaying the second shot image 203B based on the zoom-in operation. In this case, if the mobile phone 300 is in the headset mode, the mobile phone 300 may play the recorded audio through a headset in real time based on the volume V'. In this way, when the user A records the video information, the second shot image 203B in the video information appreciated by the user A can match the audio played at the volume V' and an audio-visual effect for the user A is better.

If the mobile phone 300 is not in the headset mode, after responding to a stop operation triggered by the user A on the recording key 201, the mobile phone 300 generates and stores a video file based on the second shot image 203B displayed based on the zoom-in operation and the increased volume V'. Further, when the mobile phone 300 subsequently responds to an operation of opening the video file by the user A, the mobile phone 300 plays the recorded video information. For example, the second shot image 203B is displayed on the mobile phone 300 and the recorded audio corresponding to the second shot image 203B is played through the speaker at the volume V'. Therefore, when the user A appreciates the video information, the second shot image 203B in the video information can match the audio played at the volume V', and an audio-visual effect for the user A is better.

A second implementation of this embodiment of this application further provides another video recording method. The video recording method may also be applied to a mobile phone 300. A difference from the first implementation of this embodiment of this application lies in that, in the video recording method provided in the second implementation of this embodiment of this application, the mobile phone 300 may increase only audio of a photographed object selected in a first shot image 203A after detecting a zoom-in operation, or the mobile phone 300 decreases only audio of a photographed object selected in the first shot image 203A after detecting a zoom-out operation.

A camera app is still used as an example below. With reference to a concert scenario, the following describes in detail how a user A triggers, by using the camera app, the mobile phone 300 to collect and record video information in the second implementation.

When the user A listens to a concert in a studio, the user A may open the camera app of the mobile phone 300 to record video information. For example, in response to an operation of opening the camera app by the user A, the mobile phone 300 may invoke a camera 353 to start capturing the first shot image, so as to display the captured first shot image on a preview interface of the camera app. Still as shown in (b) in FIG. 1, a preview interface 200 of the camera app includes the first shot image 203A, and the first shot image 203A includes an image of a first photographed object and an image of a second photographed object. The first shot image 203A includes an image b1 of a performer B and an image c1 of a performer C.

According to a method that is the same as the first implementation of this embodiment of this application, it may be obtained that a dimension of the image b1 of the performer B is a first display dimension x1×y1, and a dimension of the image c1 of the performer C is a second display dimension x2×y2.

Still as shown in (b) in FIG. 1, the preview interface 200 of the camera app is further configured with a recording key 201, and the user A may input a touch operation on the recording key 201. The mobile phone 300 may start recording video information in response to the touch operation performed by the user A on the recording key 201. For example, the video information max include the first shot image 203A captured by the camera 353 and the audio corresponding to the first shot image 203A captured by a microphone 304C. Further, the audio captured by the microphone 304C may include audio of the performer B and audio of the performer C. First volume of the audio of the performer B recorded by the mobile phone 300 is V1, and second volume of the recorded audio of the performer C is V2.

In addition, in the second implementation of this embodiment of this application, the mobile phone 300 subsequently increases/decreases volume of the audio of the photographed object selected by the user A in the first shot image 203A instead of increasing/decreasing volume of all audio captured by the mobile phone 300. For example, when the photographed object selected by the user A is the performer B or the performer C, the mobile phone 300 may increase/decrease volume of the audio of the performer B or volume of the audio of the performer C. Before increasing; decreasing the volume, the mobile phone 300 may recognize a facial feature in the first shot image 203A, and the mobile phone 300 may further recognize a sound feature from the recorded audio. Further, the mobile phone 300 may match a first facial feature of the performer B with a sound feature of the performer B, and match a second facial feature of the performer C with a sound feature of the performer C.

The following describes how the mobile phone 300 recognizes a facial feature in the first shot image 203A and how to recognize a sound feature from the recorded audio.

For recognizing a facial feature, as shown in FIG. 7, in an implementation, the mobile phone 300 may divide the first shot image 203A into $S_1*S_2$ grids 207 (in FIG. 7, $S_1$=4, and $S_2$=7) based on a YOLO (you only live once, YOLO) model. Then, the mobile phone 300 may sequentially perform sliding convolution in each grid 207 by using a configured sliding bounding box 208, to extract an image feature for recognition. A recognition result may include a value of the sliding bounding box hounding box) 208 and a value of confidence (confidence). Specifically, the confidence is used to indicate whether there is a face. For example, if there is a face, a value of the confidence may be a binary number 1; otherwise, if there is no face, a value of the confidence may be a binary number 0. In addition, a value of the sliding bounding box 208 is [x, y, w, h], where (x, y) is coordinates of a face center point, and (w, h) is a width and a height of the sliding bounding box 208. Therefore, the mobile phone 300 may identify the first facial feature of the performer B and the second facial feature of the performer C in the first shot image 203A of the camera app based on the foregoing manner.

Alternatively, the mobile phone 300 may further identify the first facial feature of the performer B and the second facial feature of the performer C in the first shot image 203A according to a deep learning-based video analysis algorithm (amazon recognition video, ARV). This is not limited herein.

For recognizing a sound feature from the recorded audio, the mobile phone 300 may first process the recorded audio into a plurality of audio frames. Further, the mobile phone 300 may convert, an audio signal of each audio frame in time domain into an audio signal in frequency domain according to a Mel-frequency cepstral coefficient (mel frequency cepstrum coefficient, MFCC) by using fast Fourier transform. Then, the mobile phone 300 may filter audio signals in the frequency domain, and extract, from the filtered audio signals in the frequency domain, a sound feature vector corresponding to each audio frame. Next, the mobile phone 300 may determine a similarity between sound feature vectors corresponding to the audio frames according to a cosine similarity or a Euclidean distance algorithm. Finally, the mobile phone 300 may classify sound feature vectors whose similarity is greater than a similarity threshold into one group. When the recorded audio includes the audio of the performer B and the audio of the performer C, the mobile phone 300 may obtain a group of first sound feature vectors corresponding to the audio of the performer B and a group of second sound feature vectors corresponding to the audio of the performer C according to the foregoing method, so as to identify sound features of different users in the recorded audio.

Then, the mobile phone 300 may establish an association relationship between the first facial feature and the first sound feature vector of the performer B, and establish an association relationship between the second facial feature and the second sound feature vector of the performer C according to an audio-visual recognition (audio-visual recognition, AVR) model.

Specifically, as shown in FIG. 8, the audio-visual recognition model includes a visual recognition network 1001, an audio recognition network 1002, and a matching network 1003. The mobile phone 300 may input the first facial feature of the performer B into the visual recognition network 1001, and input the first sound feature vector into the audio recognition network 1002. Further, the visual recognition network 1001 determines, based on a lip shape of the first facial feature of the performer B, a first articulation feature corresponding to the lip shape, and inputs the first articulation feature into the matching network 1003. The audio recognition network 1002 extracts a second articulation feature of the first sound feature vector, and inputs the second articulation feature into the matching network 1003. The matching network 1003 determines a similarity between the first articulation feature and the second articulation feature. If the similarity is greater than the similarity threshold, the mobile phone 300 establishes an association relationship between the first facial feature and the first sound feature vector of the performer B. Similarly, the mobile phone 300 may further establish an association relationship between the second facial feature and the second sound feature vector of the performer C based on the audio-visual recognition model. Details are not described herein again.

If the user A is only interested in a performance of the performer B, as shown in (a) in FIG. 9, the user A may input a selection operation (for example, an operation of tapping the image b1) on the image b1 of the performer B in the first shot image 203A. Certainly, the selection operation may also be an operation such as double-tapping, or touching and holding, which is not limited herein. In response to the selection operation performed by the user A on the image b1 of the performer B, the mobile phone 300 may display an adjustment key 205 and a blocking key 206 on a side of the image b1 of the performer B. As shown in (b) in FIG. 9, if the user A taps the adjustment key 205 displayed on the side of the image b1 of the performer B, in response to a tapping operation of the user A on the adjustment key 205, the mobile phone 300 may find audio of the performer B corresponding to the first sound feature vector based on the association relationship between the first facial feature and the first sound feature vector of the performer B, and mark the audio of the performer B as to-be-adjusted audio. For example, the mobile phone 300 may add a first identifier (for example, a field "1") to the audio of the performer B, to mark the audio of the performer B as the to-be-adjusted audio.

Subsequently, as shown in (a) in FIG. 4, if the user A visually feels that the performer B is far away from the user A or the user A aurally feels that the performer B is far away from the user A when watching the first shot image 203A, and an audio-visual effect is poor, the user A may input a zoom-in operation at any position on the preview interface 200. In (a) in FIG. 4, the zoom-in operation may be a touch and hold operation.

As shown in (b) in FIG. 4, after detecting the zoom-in operation input by the user A, similar to the foregoing embodiment, the mobile phone 300 may display a second shot image 203B on the preview interface 200 and record the second shot image 203B. The second shot image 203B may alternatively include an image b2 of the performer B in a third display dimension x1'×y1' and an image c2 of the performer C in a fourth display dimension x2'×y2'. The third display dimension x1'×y1' is greater than the first display dimension x1×y1, and the fourth display dimension x2'×y2' is greater than the second display dimension x2×y2.

In addition, after the mobile phone 300 detects the zoom-in operation input by the user A, if it is detected that the audio of the performer B is added with the first identifier, the mobile phone 300 may increase the first volume V1 of the audio of the performer B to third volume V1'; and if the audio of the performer C is not added with the first identifier, the second volume V2 of the audio of the performer C may remain unchanged. It may be understood that a principle of increasing the first volume V1 of the audio of the performer B to the third volume V1' in the second implementation of this application is the same as a principle of increasing the first volume V1 of the audio of the performer B to the third volume V1' in the first implementation of this application, and details are not described herein again. A difference lies in that in the first implementation, the audio of the performer B is amplified along with overall amplification of the recorded audio, while in the second implementation, the audio of the performer B is amplified separately. It may be understood that the third volume V1' is greater than the first volume V1, so that the user A visually feels that the performer B is closer to the user A.

Correspondingly, when playing the recorded audio corresponding to the second shot image 203B, the mobile phone 300 plays the audio of the performer B at the third volume V1' higher than the first volume V1, and keeps playing the audio of the performer C at the second volume V2. In this way, the user A can not only visually feel that the performer B is closer to the user A, but also can aurally feel that the performer B is closer to the user A, thereby improving an audio-visual effect of the recorded video information.

In addition, the foregoing embodiment is described by using an example in which the mobile phone 300 increases the volume of the audio of the performer B when the zoom-in operation is detected. In another embodiment, as shown in (a) in FIG. 6 and (b) in FIG. 6, the mobile phone 300 may further decrease the first volume V1 of the recorded audio of the performer B according to the foregoing method when detecting the zoom-out operation. After the zoom-out operation is detected, similar to the foregoing embodiment, the mobile phone 300 may display a third shot image 203C on the preview interface 200. The third shot image 203C includes: an image b3 of the performer B displayed in a fifth display dimension x1"×y1", and an image c3 of the performer C displayed in a sixth display dimension x2"×y2". The fifth display dimension x1"×y1" is less than the first display dimension x1×y1, and the sixth display dimension x2"×y2" is less than the second display dimension x2×y2. In addition, the mobile phone 300 decreases the first volume V1 of the recorded audio of the performer B to the fifth volume V1".

Subsequently, when playing the recorded video information, the mobile phone 300 may display the third shot image 203C. The third shot image 203C includes: the image b3 of the performer B that is displayed in the fifth display dimension x1"×1" less than the first display dimension x1×y1, and the image c3 of the performer C that is displayed in the sixth display dimension x2"×y2" less than the second display dimension x2×y2. In this way, the user A visually feels that the performer B is farther away from the user A.

Correspondingly, when playing the audio corresponding to the third shot image 203C in the video information, the mobile phone 300 plays the audio of the performer B at the fifth volume V1" lower than the first volume V1. The mobile phone 300 detects that the audio of the performer C is not added with the first identifier, and keeps playing the audio of the performer C at the second volume V2. In this way, the user A can not only visually feel that the performer B is farther away the user A, but also can aurally feel that the performer B is farther away the user A, thereby improving an audio-visual effect of the recorded video information.

For example, the camera 353 of the mobile phone 300 may be a TOF camera, and the mobile phone 300 may use the TOF camera to detect a first propagation direction of the audio of the performer B and a second propagation direction of the audio of the performer C. The first propagation direction of the audio of the performer B includes an elevation $\theta_1$ and an azimuth $\varphi_1$ of the performer B relative to the mobile phone 300, and the second propagation direction of the audio of the performer C includes an elevation $\theta_2$ and an azimuth $\varphi_2$ of the performer C relative to the mobile phone 300. Specifically, a detection process may be: In a spatial coordinate system in which the TOF camera is used as an origin of coordinates, the TOF camera may detect first coordinates (x1, r1, z1) of the performer B, and second coordinates (x2, r2, z2) of the performer C. Further, the mobile phone 300 may determine the elevation $\theta_1$ and the azimuth $\varphi_1$ of the performer B relative to the mobile phone 300 according to formulas $$\theta_1 = \cos^{-1}\frac{dz1}{\sqrt{dz1^2 + dx1^2 + dr1^2}} \text{ and } \varphi_1 = \tan^{-1}\frac{dr1}{dx1}.$$

Similarly, the mobile phone 300 may determine the elevation $\theta_2$ and the azimuth $\varphi_2$ of the performer C relative to the mobile phone 300 according to formulas $$\theta_2 = \cos^{-1}\frac{dz2}{\sqrt{dz2^2 + dx2^2 + dr2^2}} \text{ and } \varphi_2 = \tan^{-1}\frac{dr2}{dx2}.$$

In this way, the mobile phone 300 may determine the audio of the performer B by using the calculated elevation $\theta_1$ and azimuth $\varphi_1$, and the mobile phone 300 determines the second propagation direction of the audio of the performer C by using the calculated elevation $\theta_2$ and azimuth $\varphi_2$.

For example, the microphone 304C of the mobile phone 300 may be an array microphone. The array microphone of the mobile phone 300 may capture audio from different propagation directions. Further, the array microphone of the mobile phone 300 may capture the audio of the performer B in a direction whose elevation is $\theta_1$ and whose azimuth is $\varphi_1$, and perform spatial filtering on the audio of the performer B based on a spatial spectral characteristic of the audio of the performer B, so as to implement precise directional enhancement capturing on the audio of the performer B. In addition, to reduce subsequent interference caused to the audio of the performer B by the audio of the performer C, the array microphone of the mobile phone 300 may capture, based on a null position, the audio of the performer C in a direction whose elevation is $\theta_2$ and whose azimuth is $\theta_2$, so as to implement directional suppression capturing on the audio of the performer C.

Correspondingly, when the recorded audio corresponding to the second shot image 203B is played, because the audio of the performer B is captured by the array microphone of the mobile phone 300 in a directional enhancement manner, the played audio of the performer B is also clearer. In addition, the audio of the performer C is captured by the array microphone of the mobile phone 300 in a directional suppression manner, and interference to the audio of the performer B is small, thereby further improving an audio-visual effect for the user A to appreciate the video information.

Optionally, in the foregoing method, after the first electronic device captures the second shot image 203B and the audio corresponding to the second shot image 203B, the mobile phone 300 may perform noise reduction processing on the audio of the performer C in the second shot image 203B, to eliminate noise in the audio of the performer C. Correspondingly, when the recorded audio corresponding to the second shot image 203B is played, because noise reduction processing is performed on the audio of the performer C in the second shot image 203B, interference to the audio of the performer B in the second shot image 203B can be reduced.

In some other embodiments, as shown in (a) in FIG. 10, before detecting the zoom-in operation input by the user A, the mobile phone 300 may further display an adjustment key 205 and a blocking key 206 on a side of the image c1 of the performer C in response to a selection operation input by the user A on the image c1 of the performer C, and display the adjustment key 205 and the blocking key 206 on the side of the image c1 of the performer C. As shown in (b) in FIG. 10, the mobile phone 300 may respond to a tapping operation performed by the user A on the blocking key 206 displayed on the side of the image c1 of the performer C, and the mobile phone 300 may detect the second facial feature of the performer C from the image c1 of the performer C according to the foregoing method. Further, the mobile phone 300 finds the audio of the performer C based on the association relationship between the second facial feature and the sound feature of the performer C. Further, the mobile phone 300 marks the audio of the performer C in the first shot image 203A as to-be-blocked audio. For example, the mobile phone 300 may add a second identifier (for example, a field "0") to the audio of the performer C in the first shot image 203A, to mark the audio of the performer C in the first shot image 203A as the to-be-blocked audio. Further, when the mobile phone 300 records the audio corresponding to the second shot image 203B, if the mobile phone 300 detects that the audio of the performer B in the first shot image 203A is added with the first identifier, the mobile phone 300 records the audio of the performer B corresponding to the second shot image 203B at the third volume V1' higher than the first volume V1; and if the mobile phone 300 detects that the audio of the performer C in the first shot image 203A is added with the second identifier, the mobile phone 300 does not record the audio of the performer C corresponding to the second shot image 203B, and blocks the audio of the performer C corresponding to the second shot image 203B.

Correspondingly, when the recorded audio corresponding to the second shot image 203B is played, the mobile phone 300 plays the audio of the performer B at the third volume V1' higher than the first volume V1, and does not play the audio of the performer C, thereby reducing interference to the audio of the performer B.

A third implementation of this embodiment of this application further provides another video recording method. The video recording method may be applied to a mobile phone A. A structure of the mobile phone A is the same as that of the mobile phone 300 in the foregoing embodiment, and details are not described herein again. The camera app is still used as an example below. With reference to a meeting scenario in a conference room, the following describes in detail how a user A triggers, by using the camera app, the mobile phone A to collect and record video information in the third implementation. It should be noted that, as shown in FIG. 11, a distributed system may be disposed in the conference room, the distributed system include a mobile phone B held by a presenter B and a mobile phone C held by a host C, and the mobile phone B and the mobile phone C are communicatively connected through a local area network (for example, Wi-Fi or Bluetooth).

As shown in FIG. 12, when a participant A is attending a meeting in the conference room, the participant A watches the presenter B in front of the participant A making a conference report and the host C making a narration on a side of the presenter B. The user A can open the camera app on the mobile phone A to record video information. For example, in response to an operation of opening the camera app by the user A, the mobile phone A may invoke a camera 353 to start capturing a first shot image, so as to display the captured first shot image on a preview interface of the camera app. As shown in FIG. 13, a preview interface 200 of the camera app includes the first shot image 203A, and the first shot image 203A includes an image of a first photographed object and an image of a second photographed object. For example, the first shot image 203A includes an image b1 of the presenter B and an image c1 of the host C.

Still refer to FIG. 13. The preview interface 200 of the camera app is further configured with a recording key 201, and the user A may input a touch operation on the recording key 201, to trigger the mobile phone A to record video information.

A difference from the second implementation of this embodiment of this application lies in that, if the mobile phone A satisfies a trigger condition for adding to the distributed system, after the mobile phone A detects a tap operation performed by the user A on the recording key 201, as shown in FIG. 14, the first shot image 203A of the camera app may further display a prompt key 203 used to indicate to add to the distributed system.

It should be noted that the mobile phone 300 may display the prompt key 203 when the mobile phone A satisfies a condition for detecting that the user A uses the camera app of the mobile phone A for a first time. In this way, after the mobile phone A adds to the distributed system once, if a trigger condition for adding to the distributed system is subsequently satisfied again, the mobile phone A does not need to display the prompt key 203 in the first shot image 203A, but automatically adds to the distributed system, so as to avoid visual interference to the user A. In addition, when the mobile phone A satisfies a condition for detecting that the user A uses the camera app of the mobile phone A for a second time or a third time, the prompt key 203 may also be displayed on the mobile phone 300. This is not limited herein.

A trigger condition for adding to the distributed system may be, but is not limited to, that the mobile phone A, the mobile phone B, and the mobile phone C are connected to a same Wi-Fi address. Still as shown in FIG. 14, the user A may tap the prompt key 203, and the mobile phone A may respond to the tap operation performed by the user A on the prompt key 203. As shown in FIG. 15, the mobile phone A is separately communicatively connected to the mobile phone B and the mobile phone C. In this way, the mobile phone A completes an operation of adding to the distributed system, and may separately exchange data with the mobile phone B and the mobile phone C.

At the same time, the mobile phone A starts recording video information in response to a touch operation performed by the user A on the recording key 201. For example, the video information may include the first shot image 203A captured by the camera 353 and audio captured by a microphone 304C. Further, the audio captured by the microphone 304C may include audio of the presenter B and audio of the host C. First volume of the audio of the presenter B recorded by the mobile phone A is V1, and second volume of the recorded audio of the presenter C is V2.

In addition, in the third implementation of this embodiment of this application, similar to the second implementation, after detecting a zoom-in operation or a zoom-out operation input by the user on the first shot image 203A, the mobile phone A increases/decreases volume of audio of a photographed object selected in the first shot image 203A instead of increasing/decreasing volume of all audio captured by the mobile phone A. For example, when the photographed object selected by the user A is the presenter B or the host C, the mobile phone 300 may increase/decrease volume of the audio of the presenter B or volume of the audio of the host C. Therefore, before increasing/decreasing the volume, the mobile phone A may recognize a first facial feature and a second facial feature in the first shot image 203A, and recognize a first sound feature and a second sound feature in the recorded audio according to a method that is the same as the second implementation of this embodiment of this application. Details are not described herein again.

Further, as shown in FIG. 16, the mobile phone A may send, to the mobile phone B, a first facial feature of a facial image of the presenter B and a second facial feature of a facial image of the host C in the first shot image 203A, and a first sound feature of the audio of the presenter B and a second sound feature of the audio of the host C in the recorded audio. In addition, the mobile phone A may send, to the mobile phone C, the first facial feature and the second facial feature of the first shot image 203A, and the first sound feature and the second sound feature of the recorded audio.

As shown in FIG. 16, the mobile phone B may receive, from the mobile phone A, the first facial feature and the second facial feature, and the first sound feature and the second sound feature in recorded audio. Similarly, the mobile phone C may also receive, from the mobile phone A, the first facial feature and the second facial feature in the first shot image 203A, and the first sound feature and the second sound feature in the recorded audio.

For example, the mobile phone B may store different facial images and audio, and the stored facial images and audio are in a one-to-one correspondence. After receiving facial features (for example, the first facial feature and the second facial feature) sent by another device, the mobile phone B may compare each of the first facial feature and the second facial feature with all stored facial images, to obtain a corresponding facial similarity. If the mobile phone B identifies that a facial similarity between a stored facial image A and the first facial feature is greater than a specified similarity threshold, the mobile phone B may determine that the first facial feature matches the stored facial image A. Similarly, the mobile phone B may further separately compare the first sound feature and the second sound feature with all stored audio, to obtain a corresponding audio similarity. If the mobile phone B identifies that an audio similarity between stored audio A and the first sound feature is greater than a specified similarity threshold, the mobile phone B may determine that the first sound feature matches the stored audio A. When the audio A stored in the mobile phone B corresponds to the facial image A, it indicates that the first facial feature received by the mobile phone B also corresponds to the first sound feature. In this way, the mobile phone B may establish an association relationship between the first facial feature and the first sound feature, and send the association relationship between the first facial feature and the first sound feature to the mobile phone A. Further, the mobile phone A completes matching between the facial image of the presenter B and the audio of the presenter B based on the association relationship between the first facial feature and the first sound feature.

In the foregoing matching process, the association relationship obtained by the mobile phone A between the facial image of the presenter B and the audio of the presenter B is determined by the mobile phone B based on a facial image and audio that have established an association relationship. Therefore, accuracy of matching the facial image of the presenter B with the audio of the presenter B is high.

Similarly, if the mobile phone C stores one or more facial images and audio, the mobile phone C may complete matching between the facial image of the host C and the audio of the host C in a same manner, and details are not described herein again.

For example, if it is detected in the mobile phone B that there is no stored facial image and/or audio, or there is no association relationship between the stored facial image and audio, the mobile phone B cannot establish an association relationship between the first facial feature and the first sound feature. Further, the mobile phone B may send first prompt information to the mobile phone A, where the first prompt information is used to indicate that the matching fails. Then, after receiving the first prompt information from the mobile phone B, the mobile phone A may establish the association relationship between the first facial feature and the first sound feature by using an audio-visual recognition (audio-visual recognition, AVR) model in a manner the same as the second implementation of this embodiment of this application. Further, the mobile phone A completes matching between the facial image of the presenter B and the audio of the presenter B based on the association relationship between the first facial feature and the first sound feature.

Similarly, if it is detected in the mobile phone C that there is no stored facial image of the host C and/or audio of the host C, or there is no association relationship between the stored facial image and audio, the mobile phone C cannot establish an association relationship between the second facial feature and the second sound feature. Further, the mobile phone C may also send the first prompt information to the mobile phone A, where the first prompt information is used to indicate that the matching fails. Further, after receiving the first prompt information from the mobile phone C, the mobile phone A may establish the association relationship between the second facial feature and the second sound feature by using the audio-visual recognition (audio-visual recognition, AVR) model in a manner the same as the foregoing embodiment. Further, the mobile phone A completes matching between the facial image of the host C and the audio of the host C based on the association relationship between the second facial feature and the second sound feature.

If the user A is only interested in a performance of the presenter B, the user A may input a selection operation (for example, an operation of tapping the image b1) on the image b1 of the presenter B in the first shot image 203A. Certainly, the selection operation may also be an operation such as double-tapping, or touching and holding, which is not limited herein. As shown in (a) in FIG. 17, in response to the selection operation performed by the user A on the image b1 of the presenter B, the mobile phone A may display an adjustment key 205 and a blocking key 206 on a side of the image b1 of the presenter B. The selection operation may be an operation such as tapping, double-tapping, or touching and holding, which is not limited herein. As shown in (b) in FIG. 17, if the user A taps the adjustment key 205 displayed on the side of the image b1 of the presenter B, in response to a tapping operation of the user A on the adjustment key 205, the mobile phone A finds audio of the presenter B corresponding to the first sound feature vector based on the association relationship between the facial feature and the first sound feature vector of the presenter B, and marks the audio of the presenter B as to-be-adjusted audio. For example, the mobile phone 300 may add an identifier (for example, a field "1") to the audio of the presenter B, to mark the audio of the presenter B as the to-be-adjusted audio.

In addition, when watching the first shot image 203A, the user A visually feels that the presenter B is far away from the user A, or the user A aurally feels that the presenter B is far away from the user A, and an audio-visual effect is poor. As shown in (a) in FIG. 18, the user A may input a zoom-in operation at any position on the preview interface 200. Still as shown in (a) in FIG. 18, the zoom-in operation may be a touch and hold operation.

As shown in (b) in FIG. 18, after the mobile phone A detects the zoom-in operation input by the user A, similar to the foregoing embodiment, the mobile phone 300 may display a second shot image 203B on the preview interface 200 and record the second shot image 203B. The second shot image 203B may alternatively include an image b2 of the presenter B in a third display dimension x1'×y1' and an image c2 of the host C in a fourth display dimension x2'×y2'. The third display dimension x1'×y1' is greater than the first display dimension x1×y1, and the fourth display dimension x2'×y2' is greater than the second display dimension x2×y2.

In addition, similar to the foregoing embodiment, when detecting the zoom-in operation input by the user A, the mobile phone A may increase the first volume V1 of the audio of the presenter B in the second shot image 203B to the third volume V1', and the second volume V2 of the audio of the host C may remain unchanged. It may be understood that a manner of increasing the first volume V1 of the audio of the presenter B to the third volume V1' in the third implementation of this application is the same as that in the second implementation of this application, and details are not described herein again. It may be understood that the third volume V1' is greater than the first volume V1, so that the user A visually feels that the presenter B is closer to the user A.

Correspondingly, similar to the foregoing embodiment, when playing the recorded audio corresponding to the second shot image 203B, the mobile phone A plays the audio of the presenter B at the third volume V1' higher than the first volume V1, and keeps playing the audio of the host C at the second volume V2. In this way, the user A can not only visually feel that the presenter B is closer to the user A, but also can aurally feel that the presenter B is closer to the user A, thereby improving an audio-visual effect of the recorded video information.

In addition, in the third implementation of this embodiment of this application, description is given by using an example in which the first volume V1 of the audio of the presenter B is increased to the third volume V1' when the zoom-in operation is detected. In another embodiment, as shown in (a) in FIG. 19 to (b) in FIG. 19, the mobile phone 300 may further decrease the second volume of the recorded audio of the presenter B in a third shot image 203C according to the foregoing method when detecting the zoom-out operation. After the zoom-out operation is detected, similar to the foregoing embodiment, the mobile phone 300 may display the third shot image 203C on the preview interface 200. The third shot image 203C includes: an image b3 of the presenter B displayed in a fifth display dimension x1"×y1", and an image c3 of the host C displayed in a sixth display dimension x2"×y2". The fifth display dimension x1"×y1" is less than the first display dimension x1×y1, and the sixth display dimension x2"×y2" is less than the second display dimension x2×y2. In addition, the mobile phone 300 decreases the first volume V1 of the recorded audio of the presenter B in the third shot image 203C to the fifth volume V1". It may be understood that an audio-visual effect during playback of the recorded video information after the mobile phone A detects the zoom-out operation is the same as an audio-visual effect during playback of the recorded video information after the mobile phone 300 detects the zoom-out operation in the second implementation of this embodiment of this application. Details are not described herein again.

Similarly, the microphone 304C of the mobile phone 300 may be an array microphone. When responding to the selection operation input by the user A, the mobile phone 300 may detect a propagation direction of the audio of the presenter B and a propagation direction of the audio of the host C according to a method the same as that in the second implementation of this embodiment of this application, so as to perform directional enhancement capturing on the audio of the presenter B, and perform directional suppression capturing on the audio of the host C.

Similarly, the mobile phone A may further mark the audio of the host C as to-be-blocked audio according to a method the same as that in the second implementation of this embodiment of this application. For example, the mobile phone 300 may add a second identifier (for example, a field "0") to the audio of the host C, to mark the audio of the host C as the to-be-blocked audio. Further, when the mobile phone 300 records the audio, if the mobile phone 300 detects that the audio of the presenter B in the first shot image 203A is added with the first identifier, the mobile phone 300 records the audio of the presenter B in the second shot image 203B at the third volume V1' higher than the first volume V1; and if the mobile phone 300 detects that the audio of the host C in the first shot image 203A is added with the second identifier, the mobile phone 300 does not record the audio of the host C in the second shot image 203B.

Correspondingly, when the recorded audio corresponding to the second shot image 203B is played, the mobile phone 300 plays the audio of the presenter B at the third volume V1' higher than the first volume V1, and does not play the audio of the host C, thereby reducing interference to the audio of the presenter B.

Similarly, the foregoing is described by using an example in which the first volume V1 of the audio of the presenter B is increased to the third volume V1' when the zoom-in operation is detected. The mobile phone A may further increase the second volume V2 of the audio of the host C to the fourth volume V2' according to a same method as the foregoing method when detecting the zoom-in operation, and details are not described herein again.

An embodiment of this application further provides a computer-readable storage medium. The computer-readable storage medium stores computer program code. When a processor executes the computer program code, an electronic device performs the method in the foregoing embodiments.

An embodiment of this application further provides a computer program product. When the computer program product runs on an electronic device, the electronic device is enabled to perform the method in the foregoing embodiments.

Based on descriptions about the foregoing implementations, a person skilled in the art may understand that, for a purpose of convenient and brief description, division into the foregoing functional modules is used as an example for illustration. In actual application, the foregoing functions may be allocated to different functional modules and implemented according to a requirement. In other words, an inner structure of an apparatus is divided into different functional modules to implement all or some of the functions described above. For a specific working process of the system, apparatus, and unit described above, refer to the corresponding process in the foregoing method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the functions are implemented in the form of a software functional unit and sold or used as an independent product, the functions may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method implemented by a first electronic device, wherein the method comprises:
   obtaining a first operation of a user on a preview interface of an application;
   recording, in response to the first operation, a first shot image;
   recording first audio corresponding to the first shot image at a first volume, wherein the first audio comprises third audio of a first photographed object;
   establishing a first association relationship between a first image and the third audio;
   obtaining a second operation of the user on the first shot image;
   marking, in response to the second operation, the third audio as to-be-adjusted audio;
   obtaining a zoom-in operation of the user on the first shot image;
   capturing, in response to the zoom-in operation, a second shot image and second audio corresponding to the second shot image, wherein the first shot image and the second shot image are consecutive;
   recording the second shot image;
   recording the second audio at a second volume, wherein the second volume is greater than the first volume, wherein a second sound amplification ratio of a device volume output by the first electronic device to the second volume is greater than a first sound amplification ratio of the device volume to the first volume, and wherein a sound amplification ratio is a ratio of a volume output by the first electronic device to a captured volume; and
   recording, at the second volume, the third audio in the second shot image.

2. The method of claim 1, wherein the first audio comprises fourth audio of a second photographed object, and wherein the method further comprises:
   establishing a second association relationship between a second image and the fourth audio; and
   recording the fourth audio in the second shot image at the first volume or the first sound amplification ratio.

3. The method of claim 2, further comprising:
   communicatively connecting with a second electronic device and a third electronic device when the first electronic device responds to the first operation;
   extracting a first facial feature of the first photographed object and a first sound feature vector of the third audio;
   extracting a second facial feature of the second photographed object and a second sound feature vector of the fourth audio;
   sending, to the second electronic device and the third electronic device, the first facial feature, the first sound feature vector, the second facial feature, and the second sound feature vector;
   receiving, from the second electronic device, a third association relationship between the first facial feature and the first sound feature vector; and
   receiving, from the third electronic device, a fourth association relationship between the second facial feature and the second sound feature vector.

4. The method of claim 2, further comprising:
   detecting a first propagation direction of the third audio and a second propagation direction of the fourth audio;
   performing directional enhancement capturing on the third audio in the second shot image in the first propagation direction; and
   performing directional suppression capturing on the fourth audio in the second shot image in the second propagation direction.

5. The method of claim 1, wherein the first audio comprises fourth audio of a second photographed object, and wherein before capturing the second shot image and the second audio, the method further comprises:
   establishing a second association relationship between a second image and the fourth audio;
   obtaining a third operation of the user on the first shot image;
   marking, in response to the third operation, the fourth audio as to-be-adjusted audio; and
   recording the fourth audio in the second shot image at the second volume or the second sound amplification ratio.

6. The method of claim 1, wherein the first audio comprises fourth audio of a second photographed object, and wherein the method further comprises:
   establishing a second association relationship between a second image and the fourth audio; and
   blocking the fourth audio in the second shot image.

7. The method of claim 1, further comprising:
   extracting a first facial feature of the first photographed object and a first sound feature vector of the third audio;
   determining, based on a lip shape of the first facial feature, a first articulation feature corresponding to the lip shape;
   extracting a second articulation feature of the first sound feature vector; and
   establishing a second association relationship between the first facial feature and the first sound feature vector when a similarity between the first articulation feature and the second articulation feature is greater than a similarity threshold.

8. The method of claim 1, wherein before recording the second shot image and the second audio, the method further comprises determining, based on the first shot image, the second shot image, and the first volume, the second volume.

9. The method of claim 8, wherein determining the second volume comprises determining, based on a zoom ratio, the second volume, wherein $$\frac{F2}{F1}$$

is the zoom ratio, wherein F1 is a first focal length corresponding to the first shot image, and wherein F2 is a second focal length corresponding to the second shot image.

10. The method of claim 8, wherein determining the second volume comprises determining, based on a dimension scale-up ratio, the second volume, wherein $$\frac{x1' \times y1'}{x1 \times x1}$$

is the dimension scale-up ratio, wherein x1×y1 is a first display dimension of the first photographed object in the first shot image, and wherein x1'× y1' is a second display dimension of the first photographed object in the second shot image.

11. The method of claim 8, wherein determining the second volume comprises determining, based on a dimension scale-up ratio and a zoom ratio, the second volume, wherein $$\frac{F2}{F1}$$

is the zoom ratio, wherein F1 is a first focal length corresponding to the first shot image, wherein F2 is a second focal length corresponding to the second shot image, wherein $$\frac{x1' \times y1'}{x1 \times x1}$$

is the dimension scale-up ratio, wherein x1×y1 is a first display dimension of the first photographed object in the first shot image, and wherein x1' x y1' is a second display dimension of the first photographed object in the second shot image.

12. The method of claim 1, wherein the first electronic device is in a headset mode, and wherein after capturing the second shot image and the second audio, the method further comprises:
displaying the second shot image on the preview interface; and
outputting, at the second volume, the second audio to a headset for playback.

13. The method of claim 1, wherein after recording the second shot image and the second audio and when the first electronic device is not in a headset mode, the method further comprises:

obtaining a stop operation of the user on the preview interface;
generating, in response to the stop operation and based on the second shot image and the second audio, a video file;
obtaining an open operation of the user on the video file; and
in response to the open operation:
displaying the second shot image on the preview interface; and
playing the second audio at the second volume using a speaker of the first electronic device.

14. A method implemented by a first electronic device, wherein the method comprises:
obtaining a first operation of a user on a preview interface of an application;
recording, in response to the first operation, a first shot image;
recording first audio corresponding to the first shot image at a first volume, wherein the first audio comprises third audio of a first photographed object;
establishing a first association relationship between a first image and the third audio;
obtaining a second operation of the user on the first shot image;
marking, in response to the second operation, the third audio as to-be-adjusted audio;
obtaining a zoom-out operation of the user on the first shot image;
capturing, in response to the zoom-out operation, a second shot image and second audio corresponding to the second shot image, wherein the first shot image and the second shot image are consecutive;
recording the second shot image;
recording the second audio at a second volume, wherein the second volume is less than the first volume, wherein a second sound amplification ratio of a device volume output by the first electronic device to the second volume is less than a first sound amplification ratio of the first volume, and wherein a sound amplification ratio is a ratio of a volume output by the first electronic device to a captured volume; and
recording the third audio in the second shot image at the second volume or the second sound amplification ratio.

15. The method of claim 14, wherein the first audio further comprises fourth audio of a second photographed object, and wherein the method further comprises:
establishing a second association relationship between a second image and the fourth audio; and
recording the fourth audio in the second shot image at the first volume or the first sound amplification ratio.

16. The method of claim 14, wherein the method further comprises:
extracting a first facial feature of the first photographed object and a first sound feature vector of the third audio;
determining, based on a lip shape of the first facial feature, a first articulation feature corresponding to the lip shape;
extracting a second articulation feature of the first sound feature vector; and
establishing a second association relationship between the first facial feature and the first sound feature vector when a similarity between the first articulation feature and the second articulation feature is greater than a similarity threshold.

17. The method of claim 14, wherein after recording the second shot image and the second audio and when the first electronic device is not in a headset mode, the method further comprises:
- obtaining a stop operation of the user on the preview interface;
- generating, in response to the stop operation and based on the second shot image and the second audio, a video file;
- obtaining an open operation of the user on the video file; and
- in response to the open operation:
  - displaying the second shot image on the preview interface; and
  - playing the second audio at the second volume using a speaker of the first electronic device.

18. An electronic device, comprising:
- a memory configured to store instructions; and
- one or more processors coupled to the memory and configured to execute the instructions to cause the electronic device to:
  - obtain a first operation of a user on a preview interface of an application;
  - record, in response to the first operation, a first shot image;
  - record first audio corresponding to the first shot image at a first volume, wherein the first audio comprises third audio of a first photographed object;
  - establish a first association relationship between a first image and the third audio;
  - obtain a second operation of the user on the first shot image;
  - mark, in response to the second operation, the third audio as to-be-adjusted audio;
  - obtain a zoom-in operation of the user on the first shot image;
  - capture, in response to the zoom-in operation, a second shot image and second audio corresponding to the second shot image, wherein the first shot image and the second shot image are consecutive;
  - record the second shot image;
  - record the second audio at a second volume, wherein the second volume is greater than the first volume, wherein a second sound amplification ratio of a device volume output by the electronic device to the second volume is greater than a first sound amplification ratio of the device volume to the first volume, wherein a sound amplification ratio is a ratio of a volume output by the electronic device to a captured volume; and
  - record, at the second volume, the third audio in the second shot image.

19. The electronic device of claim 18, wherein the first audio comprises fourth audio of a second photographed object, and wherein the one or more processors are further configured to execute the instructions to cause the electronic device to:
- establish a second association relationship between a second image and the fourth audio; and
- record the fourth audio in the second shot image at the first volume or the first sound amplification ratio.

20. The electronic device of claim 18, wherein the one or more processors are further configured to execute the instructions to cause the electronic device to:
- extract a first facial feature of the first photographed object and a first sound feature vector of the third audio;
- determine, based on a lip shape of the first facial feature, a first articulation feature corresponding to the lip shape;
- extract a second articulation feature of the first sound feature vector; and
- establishing a second association relationship between the first facial feature and the first sound feature vector when a similarity between the first articulation feature and the second articulation feature is greater than a similarity threshold.

* * * * *